United States Patent
Yasumura

(10) Patent No.: US 6,747,883 B2
(45) Date of Patent: Jun. 8, 2004

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/354,854

(22) Filed: Jan. 30, 2003

(65) Prior Publication Data

US 2003/0155901 A1 Aug. 21, 2003

(30) Foreign Application Priority Data

| Feb. 15, 2002 | (JP) | ................................. P2002-038833 |
| Mar. 29, 2002 | (JP) | ................................. P2002-096645 |
| Sep. 26, 2002 | (JP) | ................................. P2002-281022 |

(51) Int. Cl.[7] ............................................. H02M 5/42
(52) U.S. Cl. ......................... 363/98; 363/17; 363/132
(58) Field of Search ............................. 363/17, 37, 95, 363/97, 98, 131, 132

(56) References Cited

U.S. PATENT DOCUMENTS

| 4,318,165 A | * | 3/1982 | Kornrumpf et al. ..... 363/21.02 |
| 4,736,283 A | * | 4/1988 | Yasumura ................... 363/19 |
| 5,216,585 A | * | 6/1993 | Yasumura ................... 363/19 |
| 5,450,307 A | * | 9/1995 | Yasumura ................... 363/47 |
| 5,923,543 A | * | 7/1999 | Choi ........................ 363/21.02 |
| 5,973,937 A | * | 10/1999 | Yasumura ................... 363/19 |

* cited by examiner

*Primary Examiner*—Michael Sherry
*Assistant Examiner*—Gary L. Laxton
(74) *Attorney, Agent, or Firm*—Jay H. Maioli

(57) ABSTRACT

In a complex resonance type switching power supply circuit including: a series resonant circuit formed by a leakage inductance component having a primary-side winding of an isolation converter transformer driven by switching devices formed by half-bridge coupling and a primary-side series resonant capacitor connected in series with the primary-side winding; and a partial voltage resonance circuit connected in parallel with one of the switching devices mentioned above, for effecting partial voltage resonance in time with the turning off of the switching devices, an auxiliary switching device of a series circuit is provided connected in parallel with the primary-side series resonant capacitor, formed by the auxiliary switching device and a capacitor, and is operated only during a period when the switching device connected in parallel with a primary-side partial resonance capacitor is on. During this period, the capacitor of the series circuit is connected in parallel with the primary-side series resonant capacitor. Thus, even when the gap of the isolation converter transformer is zero, the switching devices are operated stably by zero voltage switching and zero current switching.

9 Claims, 20 Drawing Sheets

F I G. 2
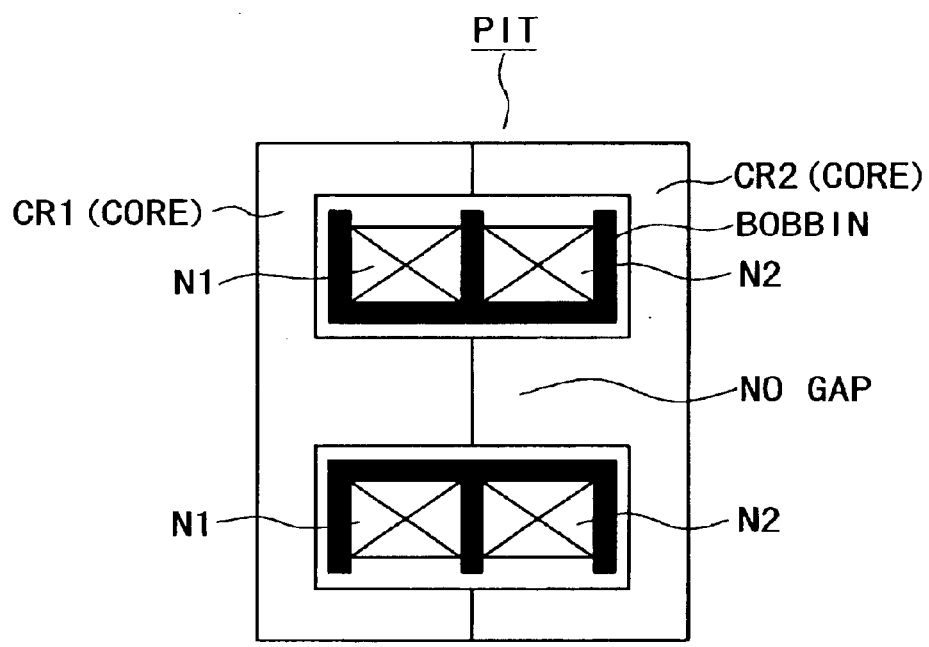

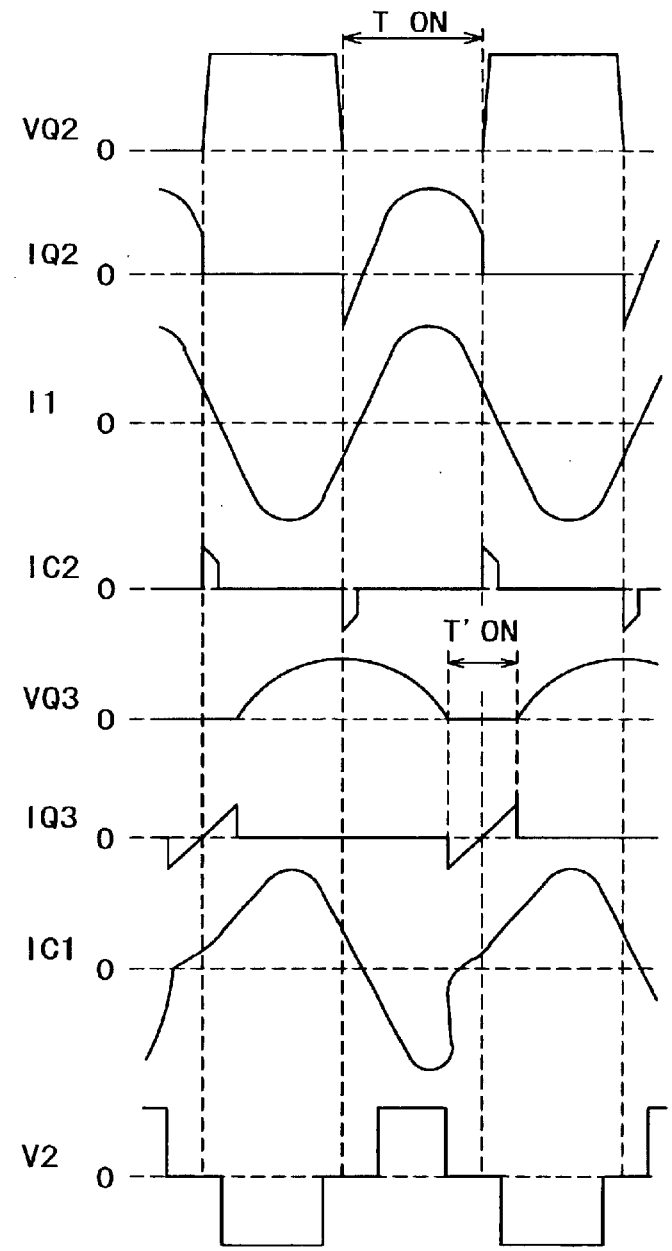
FIG. 3A VQ2
FIG. 3B IQ2
FIG. 3C I1
FIG. 3D IC2
FIG. 3E VQ3
FIG. 3F IQ3
FIG. 3G IC1
FIG. 3H V2

FIG. 4A
FIG. 4B
FIG. 4C
FIG. 4D
FIG. 4E
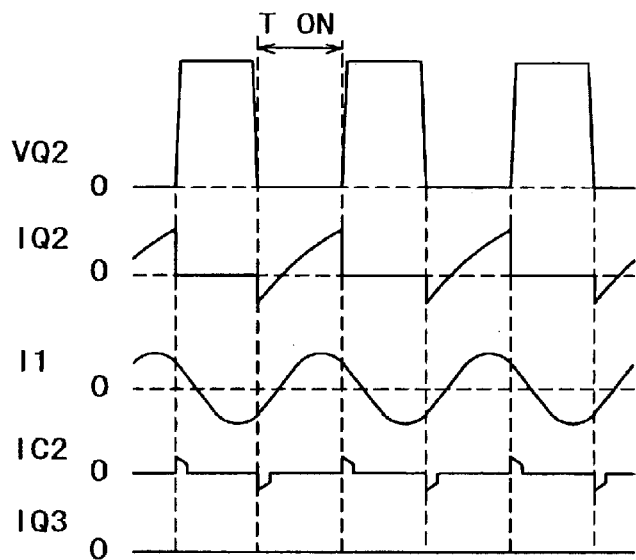
FIG. 5
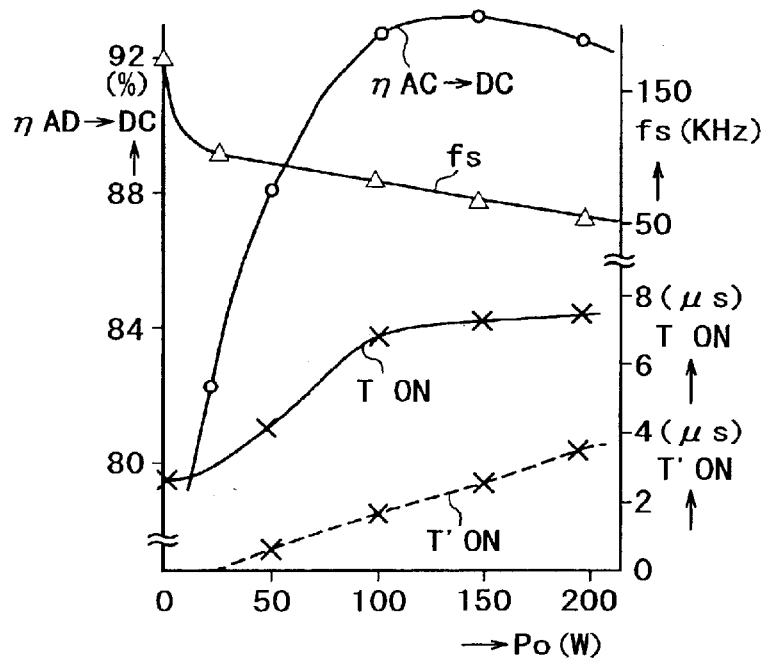

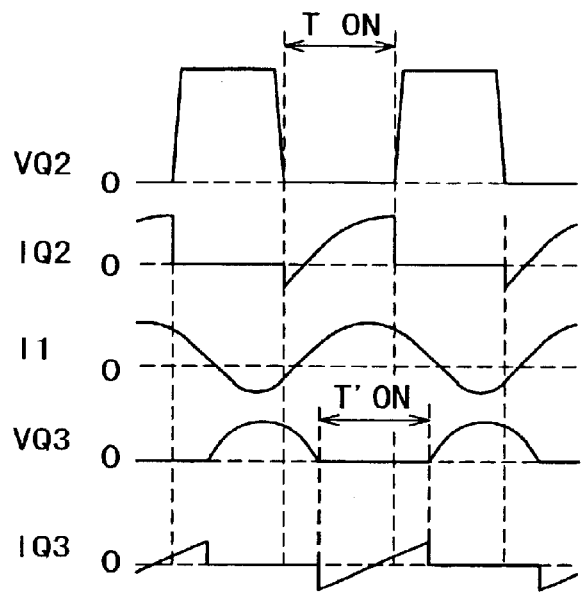
FIG. 7A VQ2
FIG. 7B IQ2
FIG. 7C I1
FIG. 7D VQ3
FIG. 7E IQ3
FIG. 8
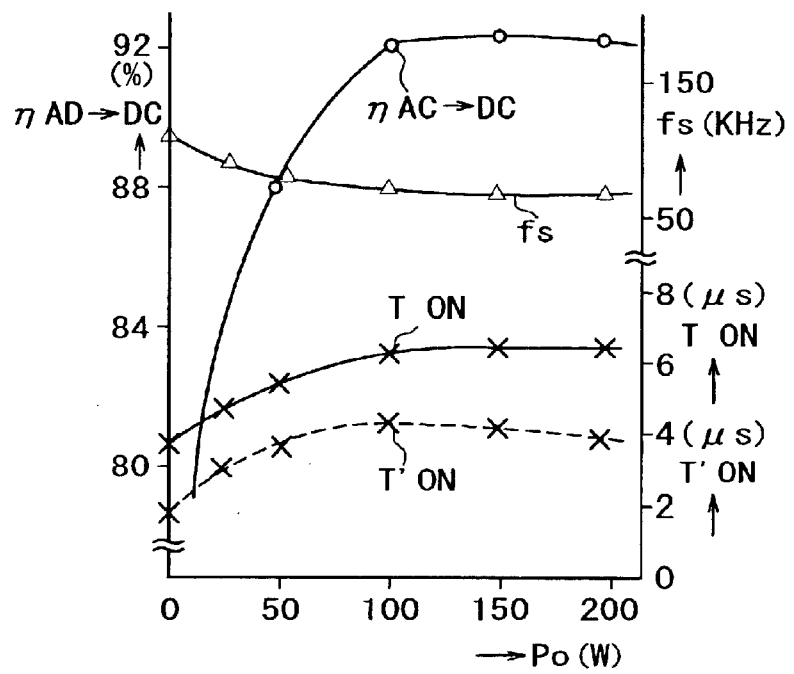

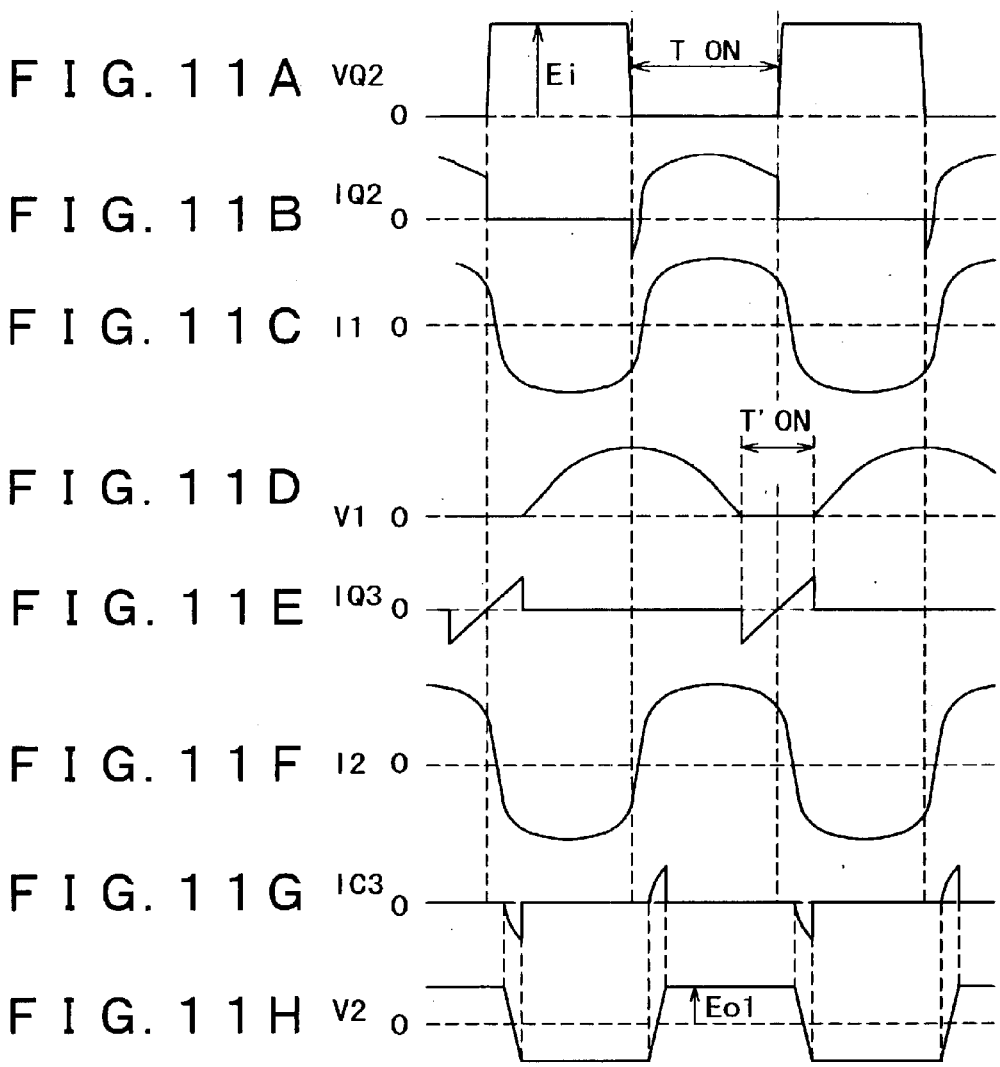

F I G. 1 2
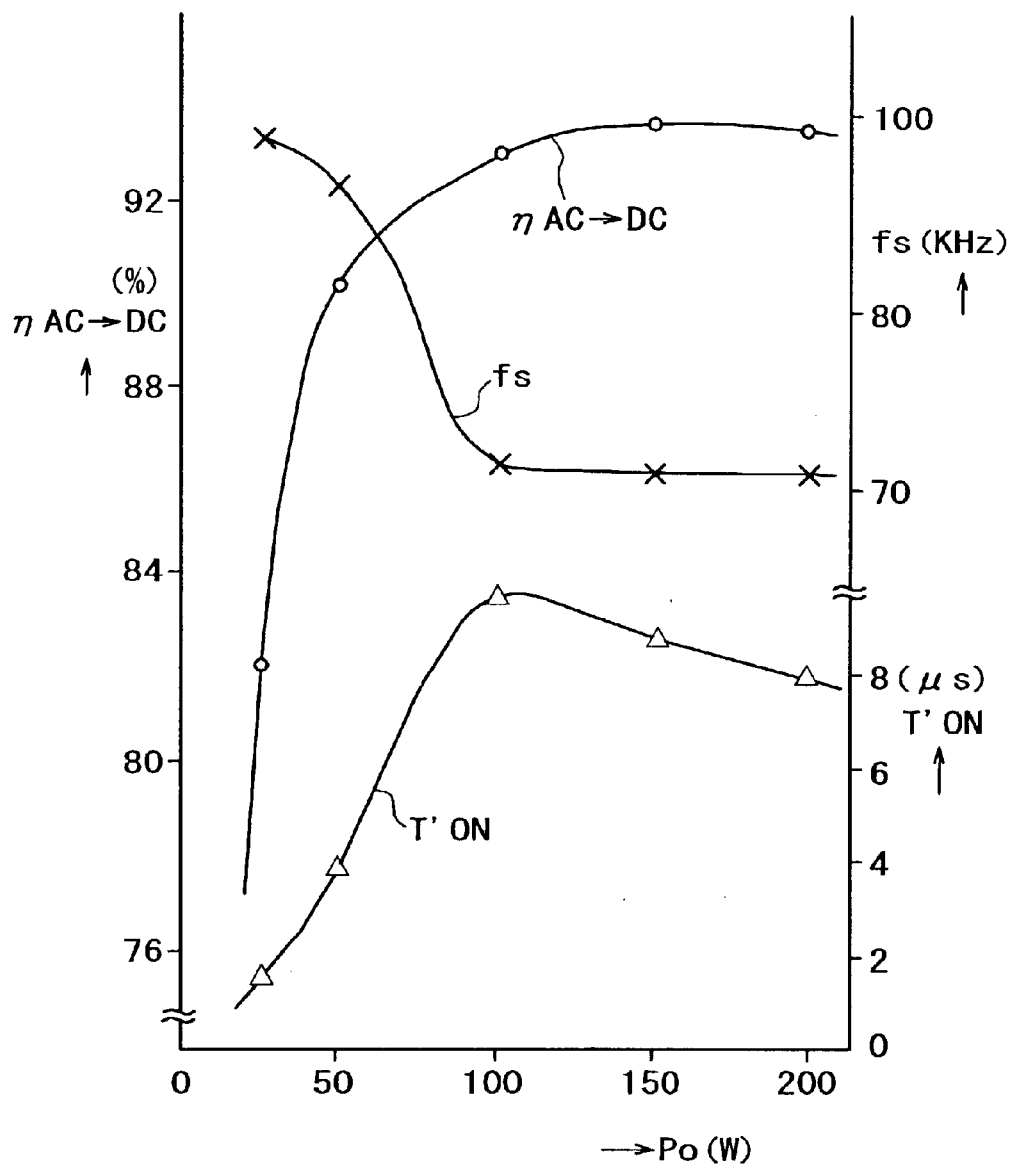

F I G. 2 1 (PRIOR ART)

SWITCHING POWER SUPPLY CIRCUIT

BACKGROUND OF THE INVENTION

The present invention relates to a switching power supply circuit provided as a power supply in various electronic apparatus.

Switching power supply circuits employing switching converters such for example as flyback converters and forward converters are widely known. These switching converters form a rectangular waveform in switching operation, and therefore there is a limit to suppression of switching noise. It is also known that because of their operating characteristics, there is a limit to improvement of power conversion efficiency.

Accordingly, various switching power supply circuits using various resonance type converters have been previously proposed by the present applicant. A resonance type converter can readily obtain high power conversion efficiency, and achieve low noise because the resonance type converter forms a sinusoidal waveform in switching operation. The resonance type converter has another advantage of being able to be formed by a relatively small number of parts.

FIG. 18 is a circuit diagram showing an example of configuration of a switching power supply circuit that can be formed on the basis of an invention of Japanese Patent Publication No. 2955582 previously proposed by the present applicant. This power supply circuit employs a self-excited current resonance type converter.

The switching power supply circuit shown in the figure is provided with a voltage doubler rectifier circuit formed by rectifier diodes Di1 and Di2 and smoothing capacitors Ci1 and Ci2 as a rectifying and smoothing circuit for receiving an alternating input voltage VAC. The voltage doubler rectifier circuit generates a rectified and smoothed voltage Ei equal to twice the alternating input voltage VAC across the serially connected smoothing capacitors Ci1 and Ci2.

The switching converter of the power supply circuit is connected such that two switching devices Q1 and Q2 are coupled by half-bridge coupling, and inserted between a node on the positive electrode side of the smoothing capacitor Ci1 and a ground, as shown in FIG. 18. In this case, a bipolar transistor (BJT; junction transistor) is employed as the switching devices Q1 and Q2.

An orthogonal type control transformer PRT (Power Regulating Transformer) is provided to drive the switching devices Q1 and Q2 and effect constant-voltage control as later described.

The orthogonal type control transformer PRT is formed as an orthogonal type saturable reactor in which driving windings NB1 and NB2 and a resonance current detecting winding ND for detecting resonance current are wound as shown in FIG. 22, and a control winding NC is wound in a direction orthogonal to these windings.

An isolation converter transformer PIT1 (Power Isolation Transformer) transmits a switching output of the switching devices Q1 and Q2 to a secondary side.

As shown in FIG. 20, the isolation converter transformer PIT1 has an E-E-shaped core formed by combining E-shaped cores CR1 and CR2 of for example a ferrite material in such a manner that magnetic legs of the core CR1 are opposed to magnetic legs of the core CR2, and has a primary winding N1 and a secondary winding N2 (N3) wound around a central magnetic leg of the E-E-shaped core in a state of being divided from each other by a dividing bobbin B. In this case, the primary winding N1 and the secondary windings N2 and N3 are each formed by winding a litz wire of about 60 mmφ around the dividing bobbin B.

In this case, a gap G of 0.5 mm to 1.0 mm is formed in the central magnetic leg of the E-E-shaped core, whereby a state of loose coupling at a coupling coefficient k≠0.85, for example, is obtained between the primary winding N1 and the secondary windings N2 and N3.

One end of the primary winding N1 of the isolation converter transformer PIT1 is connected to a node (switching output point) of an emitter of the switching device Q1 and a collector of the switching device Q2 via the resonance current detecting winding ND, and thereby obtains the switching output. Another end of the primary winding N1 is connected to the primary-side ground via a primary-side series resonant capacitor Cr1 formed by a film capacitor, for example.

A primary-side parallel resonant capacitor Cr2 for primary-side partial voltage resonance is connected in parallel with the collector and emitter of the switching device Q2. The primary-side parallel resonant capacitor Cr2 is provided for ZVS (Zero Voltage Switching) operation and ZCS (Zero Current Switching) operation of the switching devices Q1 and Q2.

The secondary windings N2 and N3 are wound independently of each other on the secondary side of the isolation converter transformer PIT1 in FIG. 18. The secondary winding N2 is connected with a bridge rectifier diode DBR and a smoothing capacitor C01, whereby a direct-current output voltage E01 is generated. The secondary winding N3 is provided with a center tap. The secondary winding N3 is connected with rectifier diodes D01 and D02 and a smoothing capacitor C02 as shown in the figure, whereby a full-wave rectifier circuit formed by the rectifier diodes D01 and D02 and smoothing capacitor C02 generates a direct-current output voltage E02.

In this case, the direct-current output voltage E01 is also inputted from a branch point to a control circuit 1.

The control circuit 1 for example supplies, as a control current, a direct current whose level is changed according to level of the secondary-side direct-current output voltage E01 to the control winding NC of the orthogonal type control transformer PRT, and thereby effects constant-voltage control.

FIG. 19 is a circuit diagram showing an example of configuration of another power supply circuit that can be formed on the basis of an invention previously proposed by the present applicant. The same parts as in the power supply circuit shown in FIG. 18 are identified by the same reference numerals, and their description will be omitted.

The power supply circuit shown in FIG. 19 is also provided with a current resonance type converter in which two switching devices Q11 and Q12 are coupled by half-bridge coupling. However, a driving system for the current resonance type converter is an external excitation system. In this case, a MOS-FET or an IGBT (Insulated Gate Bipolar Transistor) is used as the switching devices Q11 and Q12.

In this case, a rectifying and smoothing circuit formed by a bridge rectifier circuit Di and a smoothing capacitor Ci rectifies and smoothes an alternating input voltage VAC of a commercial alternating-current power supply AC, and thereby generates a direct-current input voltage equal to a peak value of the alternating input voltage VAC multiplied by unity, for example.

Gates of the switching devices Q11 and Q12 are connected to an oscillating and driving circuit 11. The switching device Q11 has a drain connected to a positive electrode of the smoothing capacitor Ci, and a source connected to a primary-side ground via a primary winding N1 and a primary-side series resonant capacitor Cr1. The switching device Q12 has a drain connected to the source of the switching device Q11, and a source connected to the primary-side ground.

Also in this case, a primary-side parallel resonant capacitor Cr2 for primary-side partial voltage resonance is connected in parallel with the drain and the source of the switching device Q12.

Further, a clamp diode DD1 is connected in parallel with the drain and the source of the switching device Q11, and a clamp diode DD2 is connected in parallel with the drain and the source of the switching device Q12.

The switching devices Q11 and Q12 are driven by the oscillating and driving circuit 11 for switching operation described earlier with reference to FIG. 18.

Specifically, a control circuit 2 in this case supplies a current or a voltage varied in level according to variation in a direct-current output voltage E01 to the oscillating and driving circuit 11 on the primary side via a photocoupler PC. In order to stabilize the direct-current output voltage E01, the oscillating and driving circuit 11 outputs a switching driving signal (voltage) varied in cycle according to the level of the output from the control circuit 2 to the gates of the switching devices Q11 and Q12 alternately. Thereby switching frequency fs of the switching devices Q11 and Q12 is varied.

In this case, the oscillating and driving circuit 11 is supplied with a starting voltage via a starting resistance RS, and supplied with a smoothed output, as a driving voltage therefor, obtained by smoothing an output of a winding N4 wound additionally on the primary side of an isolation converter transformer PIT2 by a capacitor C1.

As an example of characteristics of the power supply circuit shown in FIG. 18, FIG. 21 shows characteristics of variations in AC-to-DC power conversion efficiency ηAC→DC, switching frequency fs, and the period TON of the switching device Q2 when load power Po of the secondary-side direct-current output voltage E01 is varied from 0 W to 200 W.

FIG. 21 shows characteristics when the number of turns of each of the primary winding Ni and the secondary winding N2 of the isolation converter transformer PIT1 is selected to be 45 T (turns), 0.056 μF is selected for the primary-side series resonant capacitor Cr1, and 330 pF is selected for the primary-side parallel resonant capacitor Cr2 so as to correspond to conditions of an AC 200 V system.

As shown in FIG. 21, the switching frequency fs of the power supply circuit shown in FIG. 18 is controlled to be lowered as the load power Po is increased. Also, as the load power Po is increased, the period TON during which the switching device Q2 is on is controlled to be lengthened.

The power conversion efficiency ηAC→DC in this case is about 91.8% at a load power Po of 200 W, and is about 92.4% at a load power Po of 150 W. Thus, the best efficiency is obtained at the load power Po of 150 W.

The AC-to-DC power conversion efficiency ηAC→DC of the power supply circuit shown in FIG. 18 when the voltage doubler rectifier circuit as shown in FIG. 18 rectifies the commercial alternating voltage is about 92%, and the AC-to-DC power conversion efficiency ηAC→DC of the power supply circuit shown in FIG. 19 when the full-wave rectifier circuit as shown in FIG. 19 rectifies the commercial alternating voltage is about 90%. It is desirable that power loss resulting from such AC-to-DC power conversion be as small as possible.

As a means for improving the AC-to-DC power conversion efficiency ηAC→DC, it is conceivable that the gap G is not formed in the central magnetic leg of the E-E-shaped core forming the isolation converter transformer PIT1 or PIT2.

However, in the case of the power supply circuit shown in FIG. 18, for example, a range of the switching frequency fs of the switching devices Q1 and Q2 needs to be set so that a predetermined secondary-side direct-current output voltage E01 (for example 135 V) is obtained even when the alternating input voltage VAC is a minimum alternating input voltage (for example 90 V) and the load power Po is a maximum load power (for example 200 W). That is, a range of series resonance frequency fo determined by leakage inductance of the primary winding N1 of the isolation converter transformer PIT1 and capacitance of the primary-side series resonant capacitor Cr1 needs to be determined in consideration of the case where the alternating input voltage VAC is the minimum alternating input voltage.

Thus, in the power supply circuit shown in FIG. 18, a small capacitance value must be selected as the capacitance value of the primary-side series resonant capacitor Cr1, and unless a gap G of about 0.5 mm to 1.0 mm is formed in the central magnetic leg of the isolation converter transformer PIT1, the switching devices Q1 and Q2 cannot be operated stably by ZVS and ZCS.

In addition, the gap G in the central magnetic leg of the isolation converter transformer PIT1 or PIT2 as shown in FIG. 20 is formed by grinding a ferrite core. Therefore a grinding process is required, and increases cost correspondingly.

Further, the primary winding N1 and the secondary winding N2 in the proximity of the gap of the isolation converter transformer PIT1 or PIT2 increase the temperature due to an eddy current loss caused by a fringe magnetic flux. Further, since the isolation converter transformers PIT1 and PIT2 are a loosely coupled transformer, measures for shielding against leakage flux such as providing a short ring formed by a copper plate around the periphery of the transformer are required.

SUMMARY OF THE INVENTION

Accordingly, in view of the above problems, a switching power supply circuit according to the present invention is comprised as follows.

The switching power supply circuit according to the present invention includes: switching means formed by half-bridge coupling of two switching devices, for performing switching operation on a direct-current input voltage; an isolation converter transformer having a primary winding and a secondary winding formed around a magnetic core having no gap formed therein, for transmitting an output of the switching means obtained in the primary winding to the secondary winding; and a primary-side series resonant circuit formed at least by a leakage inductance component including the primary winding of the isolation converter transformer and capacitance of a primary-side series resonant capacitor connected in series with the primary winding, for converting the switching operation of the switching devices into current resonance type operation. The switching power supply circuit further includes: a primary-side partial resonance capacitor connected in parallel with one of the two switching devices, for effecting partial resonance in timing corresponding to a turn-off time of the two switching devices; switching driving means for applying a switching driving signal to the two switching devices for switching operation; a series circuit connected in parallel with the primary-side series resonant capacitor, and formed at least by a series connection of an auxiliary switching device for performing switching operation so as to have an on period in correspondence with timing of turning off of the switching device with which the primary-side partial resonance capacitor is connected and a capacitor for which more than a predetermined capacitance value is selected; and direct-current output voltage generating means for receiving an alternating voltage obtained at the secondary winding of the isolation converter transformer as an input and generating a predetermined secondary-side direct-current output voltage.

With the above configuration, since no gap is formed in the isolation converter transformer, AC-to-DC power conversion efficiency is improved and leakage magnetic flux is reduced. In this case, the auxiliary switching device of the series circuit connected in parallel with the primary-side series resonant capacitor is operated only during a period when the switching device connected in parallel with the primary-side partial resonance capacitor is on. During this period, the capacitor of the series circuit is connected in parallel with the primary-side series resonant capacitor. Thus, even when the gap of the isolation converter transformer is reduced to zero, the switching devices can be operated stably by zero voltage switching and zero current switching.

BRIEF DESCRIPTION OF THE DRAWINGS

FIG. 2 is a sectional view of an example of structure of an isolation converter transformer provided in the power supply circuit according to the first embodiment;

FIGS. 3A, 3B, 3C, 3D, 3E, 3F, 3G, and 3H are waveform charts showing operation of the power supply circuit according to the first embodiment at heavy load;

FIGS. 4A, 4B, 4C, 4D, and 4E are waveform charts showing operation of the power supply circuit according to the first embodiment at light load;

FIG. 5 is a characteristic diagram showing characteristics of power conversion efficiency, switching frequency, and period TON with respect to load power of the power supply circuit according to the first embodiment;

FIGS. 7A, 7B, 7C, 7D, and 7E are waveform charts showing operation of the power supply circuit according to the second embodiment at light load;

FIG. 8 is a characteristic diagram showing characteristics of power conversion efficiency, switching frequency, and period TON with respect to load power of the power supply circuit according to the second embodiment;

FIGS. 11A, 11B, 11C, 11D, 11E, 11F, 11G, and 11H are waveform charts showing operation of the power supply circuit according to the fourth embodiment;

FIG. 12 is a characteristic diagram showing characteristics of power conversion efficiency, switching frequency, and period TON with respect to load power of the power supply circuit according to the fourth embodiment;

DETAILED DESCRIPTION OF PREFERRED EMBODIMENTS

Figure 1:
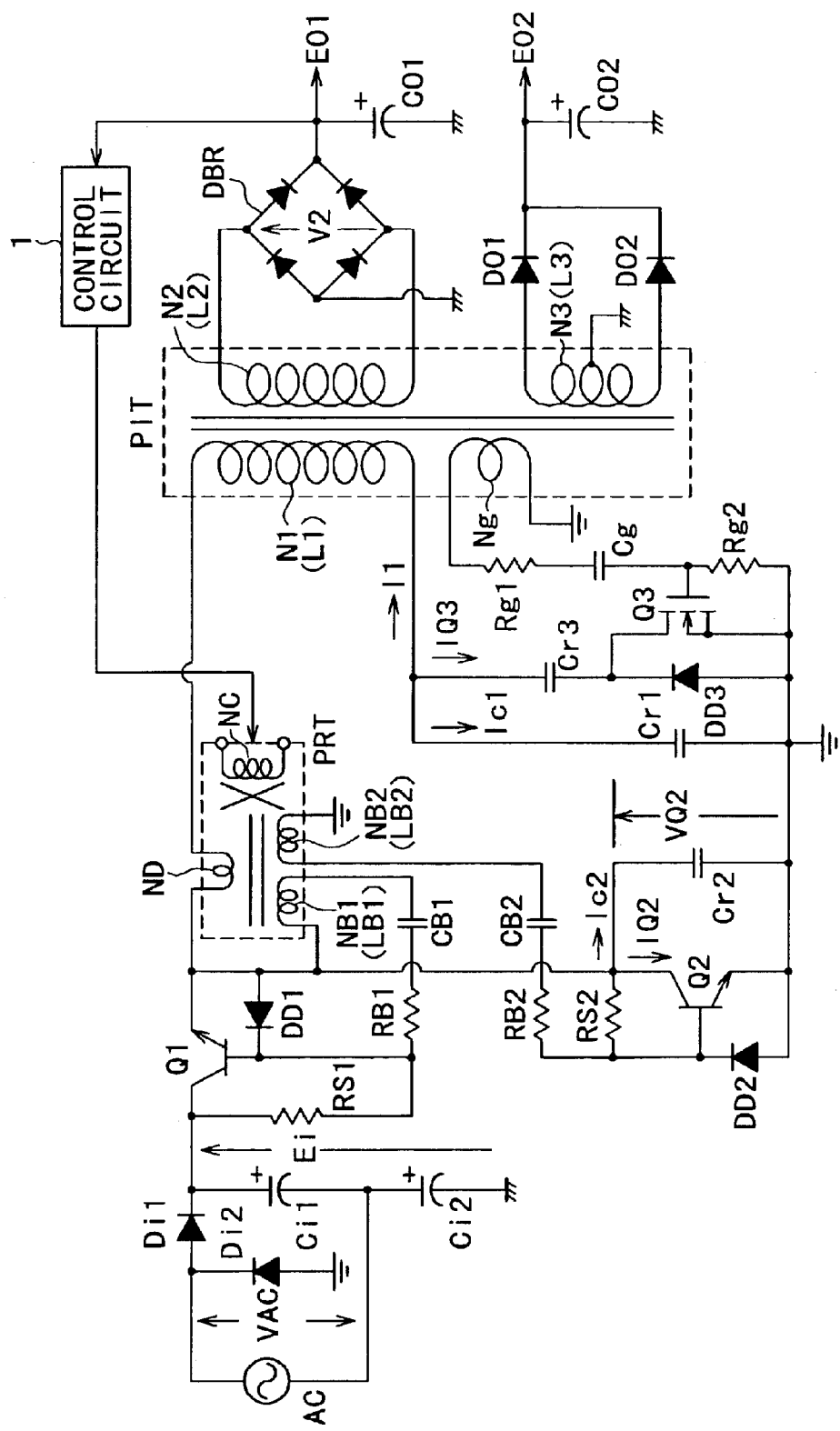
FIG. 1 is a circuit diagram showing an example of configuration of a power supply circuit according to a first embodiment of the present invention.

FIG. 1 shows a configuration of a power supply circuit according to a first embodiment of the present invention.

The power supply circuit shown in FIG. 1 employs a configuration of a resonance type switching converter provided with a current resonance type converter on the primary side.

The switching power supply circuit shown in the figure is provided with a voltage doubler rectifier circuit formed by rectifier diodes Di1 and Di2 and smoothing capacitors Ci1 and Ci2 as a rectifying and smoothing circuit for receiving an alternating input voltage VAC. The voltage doubler rectifier circuit generates a rectified and smoothed voltage Ei equal to twice the alternating input voltage VAC across the serially connected smoothing capacitors Ci1 and Ci2.

The switching converter of the power supply circuit is connected such that two switching devices Q1 and Q2 are coupled by half-bridge coupling, and inserted between a node on the positive electrode side of the smoothing capacitor Ci and a ground, as shown in FIG. 1. In this case, a bipolar transistor (BJT; junction transistor) is employed as the switching devices Q1 and Q2.

A starting resistance RS1 is inserted between a collector and a base of the switching device Q1 and a starting resistance RS2 is inserted between a collector and a base of the switching device Q2.

A clamp diode DD1 is inserted between the base and an emitter of the switching device Q1, and a clamp diode DD2 is inserted between the base and an emitter of the switching device Q2. In this case, a cathode of the clamp diode DD1 is connected to the base of the switching device Q1, and an anode of the clamp diode DD1 is connected to the emitter of the switching device Q1. Similarly, a cathode of the clamp diode DD2 is connected to the base of the switching device Q2, and an anode of the clamp diode DD2 is connected to the emitter of the switching device Q2.

A series connection circuit of a base current limiting resistance RB1, a resonant capacitor CB1, and a driving winding NB1 is inserted between the base of the switching device Q1 and the collector of the switching device Q2. Capacitance of the resonant capacitor CB1 and inductance LB1 of the driving winding NB1 together form a series resonant circuit.

Similarly, a series connection circuit of a base current limiting resistance RB2, a resonant capacitor CB2, and a driving winding NB2 is inserted between the base of the switching device Q2 and the primary-side ground. Capacitance of the resonant capacitor CB2 and inductance LB2 of the driving winding NB2 together form a series resonant circuit for self-oscillation.

An orthogonal type control transformer PRT (Power Regulating Transformer) is provided to drive the switching devices Q1 and Q2 and effect constant-voltage control as later described.

The orthogonal type control transformer PRT is formed as an orthogonal type saturable reactor in which the driving windings NB1 and NB2 and a resonance current detecting winding ND for detecting resonance current are wound and a control winding NC is wound in a direction orthogonal to these windings.

The driving winding NB1 has one end connected to the base of the switching device Q1 via a series connection of the resonant capacitor CB1 and the resistance RB1, and another end connected to the collector of the switching device Q2. The driving winding NB2 has one end connected to the ground, and another end connected to the base of the switching device Q2 via a series connection of the resonant capacitor CB2 and the resistance RB2. The driving winding NB1 and the driving winding NB2 are wound so as to generate voltages of opposite polarities to each other.

One end of the resonance current detecting winding ND is connected to a node (switching output point) of the emitter of the switching device Q1 and the collector of the switching device Q2, and another end of the resonance current detecting winding ND is connected to one end of a primary winding N1 of an isolation converter transformer PIT to be described later. Incidentally, the number of turns of the resonance current detecting winding ND is about 1 T (turn), for example.

Figure 22:
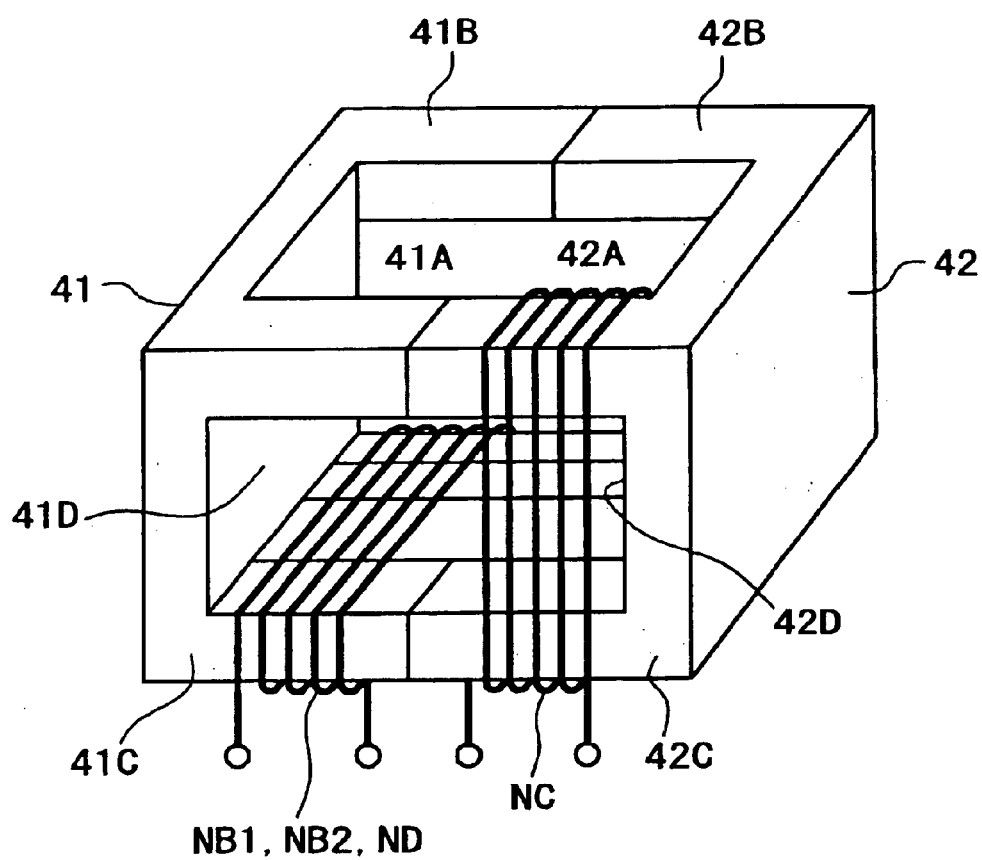
FIG. 22 is a sectional view of an example of structure of an orthogonal type transformer provided in the prior art power supply circuit.

As shown in FIG. 22, the structure of the orthogonal type control transformer PRT is a cubic core formed by connecting two cores 41 and 42 each having four magnetic legs with each other at ends of the magnetic legs. The resonance current detecting winding ND and the driving winding NB are wound around two given magnetic legs 41C and 41D of the cubic core in the same winding direction, and the control winding NC is wound around two magnetic legs 42A and 42C placed in a direction orthogonal to the resonance current detecting winding ND and the driving windings NB1 and NB2.

In the power supply circuit according to the first embodiment, the structure of the isolation converter transformer PIT for transmitting a switching output of the switching devices Q1 and Q2 to the secondary side is different from the structure of the prior art isolation converter transformer PIT1.

Figure 20:
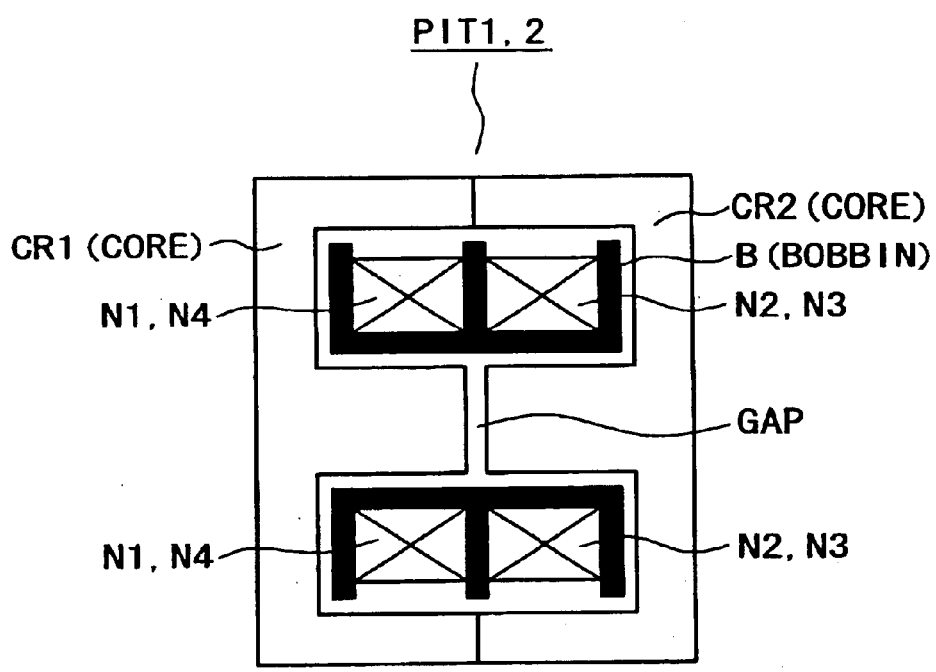
FIG. 20 is a sectional view of an example of structure of an isolation converter transformer provided in the prior art power supply circuit.
Figure 21:
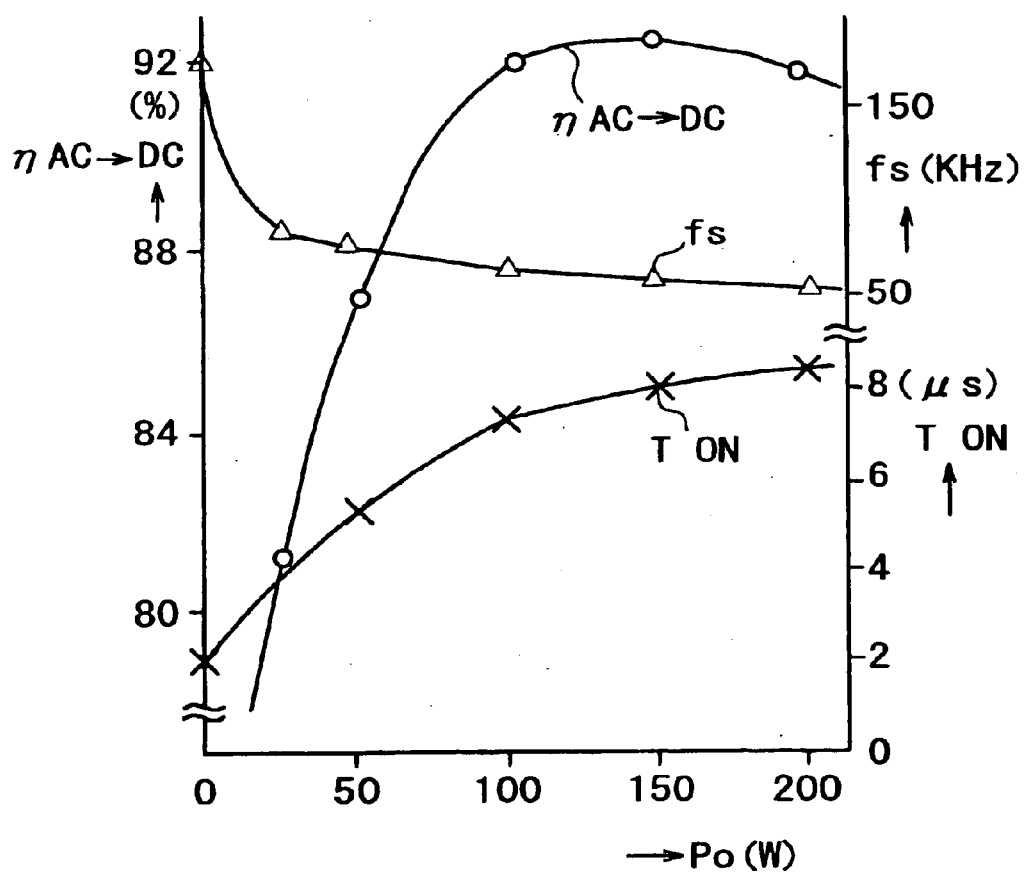
FIG. 21 is a characteristic diagram showing characteristics of power conversion efficiency, switching frequency, and period TON with respect to load power of the prior art power supply circuit.

As with the isolation converter transformer PIT1 shown in FIG. 20, the isolation converter transformer PIT shown in FIG. 2 has an E-E-shaped core formed by combining E-shaped cores CR1 and CR2 of a ferrite material in such a manner that magnetic legs of the core CR1 are opposed to magnetic legs of the core CR2, and has a primary winding N1 and a secondary winding N2 wound around a central magnetic leg of the E-E-shaped core in a state of being divided from each other by a dividing bobbin B. The isolation converter transformer PIT shown in FIG. 2 is different from the isolation converter transformer PIT1 shown in FIG. 20 in that the gap G is not formed in the central magnetic leg of the E-E-shaped core of the isolation converter transformer PIT.

In this case, the primary winding N1 and the secondary winding N2 are each formed by winding a litz wire of about 60 mm$\phi$ around the dividing bobbin B. Thereby a state of coupling between the primary winding N1 and the secondary winding N2 at a coupling coefficient k of about 0.90, for example, is obtained.

One end of the primary winding N1 of the isolation converter transformer PIT is connected to the node (switching output point) of the emitter of the switching device Q1 and the collector of the switching device Q2 via the resonance current detecting winding ND, and thereby obtains the switching output. Another end of the primary winding N1 is connected to the primary-side ground via a primary-side series resonant capacitor Cr1 formed by a film capacitor, for example.

In this case, the primary-side series resonant capacitor Cr1 and the primary winding N1 are connected in series with each other. Capacitance of the primary-side series resonant capacitor Cr1 and leakage inductance L1 of the isolation converter transformer PIT including the primary winding N1 form a series resonant circuit for converting operation of the switching converter into current resonance type operation.

A primary-side parallel resonant capacitor Cr2 for primary-side partial voltage resonance is connected in parallel with the collector and the emitter of the switching device Q2.

The primary-side parallel resonant capacitor Cr2 is provided for ZVS operation and ZCS (Zero Current Switching) operation of the switching devices Q1 and Q2.

Thus, the power supply circuit shown in FIG. 1 employs a configuration of a "complex resonance type switching converter".

In the power supply circuit according to the first embodiment, a series circuit of a capacitor Cr3 for controlling capacitance voltage of the primary-side series resonant capacitor Cr1 and an auxiliary switching device Q3 is connected in parallel with the primary-side series resonant capacitor Cr1.

The auxiliary switching device Q3 has a drain connected to the capacitor Cr3, and a clamp diode DD3 is connected in parallel with the drain and a source of the auxiliary switching device Q3. The source of the auxiliary switching device Q3 is connected to the primary-side ground.

In this case, three times a capacitance value of the primary-side series resonant capacitor Cr1 or more is selected as a capacitance value of the capacitor Cr3. A MOS-FET or an IGBT (Insulated Gate Bipolar Transistor) is used as the auxiliary switching device Q3.

As shown in FIG. 1, as a driving circuit system for driving the auxiliary switching device Q3, a series connection circuit of a capacitor Cg, a resistance Rg1, and a driving winding Ng is connected to a gate of the auxiliary switching device Q3. Further, a resistance Rg2 is connected between the gate and the primary-side ground. Such a series connection circuit forms a self-oscillation driving circuit for driving the auxiliary switching device Q3.

The driving winding Ng is formed independently on the primary side of the isolation converter transformer PIT. It is to be noted that when the number of turns of the driving winding Ng is 1 T, operation of the driving winding Ng is insured; however, the number of turns of the driving winding Ng is not limited to 1 T.

Secondary windings N2 and N3 are wound on the secondary side of the isolation converter transformer PIT in FIG. 1. The secondary winding N2 is connected with a bridge rectifier diode DBR and a smoothing capacitor C01, whereby a direct-current output voltage E01 is generated. The secondary winding N3 is provided with a center tap, and connected with rectifier diodes D01 and D02 and a smoothing capacitor C02 as shown in the figure, whereby a full-wave rectifier circuit formed by the [rectifier diodes D01 and D02 and smoothing capacitor C02] generates a direct-current output voltage E02.

In this case, the direct-current output voltage E01 is also inputted from a branch point to a control circuit 1.

The control circuit 1 for example supplies, as a control current, a direct current whose level is changed according to level of the secondary-side direct-current output voltage E01 to the control winding NC of the orthogonal type control transformer PRT, and thereby effects constant-voltage control as later described.

In switching operation of the thus formed power supply circuit, when commercial alternating-current power is first turned on, a starting current is supplied to the bases of the switching devices Q1 and Q2 via the starting resistances RS1 and RS2, for example. When the switching device Q1 is first turned on, for example, the switching device Q2 is controlled to be turned off. Then, as an output of the switching device Q1, a resonance current flows through the resonance current detecting winding ND, the primary winding N1, and then the primary-side series resonant capacitor Cr1. Around when the resonance current becomes zero, the switching device Q2 is controlled to be turned on, and the switching device Q1 is controlled to be turned off. Then a resonance current in an opposite direction to that of the foregoing resonance current flows via the switching device Q2. Thereafter, self-excited switching operation in which the switching devices Q1 and Q2 are alternately turned on is performed.

Thus, using the terminal voltage of the smoothing capacitor Ci as operating power, the switching devices Q1 and Q2 are alternately opened and closed repeatedly, whereby a driving current close to resonance current in waveform is supplied to the primary winding N1 of the isolation converter transformer PIT, and then an alternating output is obtained in the secondary-side windings N2 and N3.

The constant-voltage control by the orthogonal type control transformer PRT is effected as follows.

When the secondary-side direct-current output voltage E01 is varied by variation in the alternating input voltage or load power, for example, the control circuit 1 variably controls the level of the control current flowing through the control winding NC according to the variation in the secondary-side direct-current output voltage E01.

A magnetic flux generated by the control current in the orthogonal type control transformer PRT acts to change a state of saturation tendency in the orthogonal type control transformer PRT and change inductance of the driving windings NB1 and NB2. Thus conditions of the self-oscillation circuit are changed, and hence switching frequency fs is changed.

In the power supply circuit shown in FIG. 1, the switching frequency fs is set in a frequency range higher than that of resonance frequency of the series resonant circuit of the primary-side series resonant capacitor Cr1 and the primary winding N1. When the switching frequency fs is increased, for example, a difference between the switching frequency fs and the resonance frequency of the series resonant circuit becomes greater. Thereby a resonance impedance of the primary-side series resonant circuit to the switching output becomes higher.

The higher resonance impedance controls the driving current supplied to the primary winding Ni of the primary-side series resonant circuit, and consequently controls the secondary-side direct-current output voltage E01, whereby the constant-voltage control on the secondary-side direct-current output voltage E01 is effected.

FIGS. 3A, 3B, 3C, 3D, 3E, 3F, 3G, and 3H and FIGS. 4A, 4B, 4C, 4D, and 4E are waveform charts showing operation of main parts in the power supply circuit shown in FIG. 1. FIGS. 3A, 3B, 3C, 3D, 3E, 3F, 3G, and 3H show operating waveforms at an alternating input voltage VAC=100 V and a load power Po=200 W (heavy load). FIGS. 4A, 4B, 4C, 4D, and 4E show operating waveforms at an alternating input voltage VAC=100 V and a load power Po=25 W (light load).

As shown in FIGS. 3A, 3B, 3C, 3D, 3E, 3F, 3G, and 3H, at the alternating input voltage VAC=100 V and the load power Po=200 W (heavy load), when alternating-current power is turned on, a starting current is supplied to the base of the switching device Q1 via the starting resistance RS1, for example. When the switching device Q1 is turned on, the switching device Q2 is controlled to be turned off. Then, as an output of the switching device Q1, a resonance current flows through the primary winding N1 and then the primary-side series resonant capacitor Cr1. Around when the resonance current becomes zero, the switching device Q2 is controlled to be turned on, and the switching device Q1 is controlled to be turned off. Thereafter, the switching devices Q1 and Q2 are controlled to be alternately turned on.

Thus, in a period TON during which the switching device Q2 is turned on and a period during which the switching device Q2 is turned off, the switching device Q2 has a collector-to-emitter voltage VQ2 having a waveform as shown in FIG. 3A, and a collector current IQ2 having a waveform as shown in FIG. 3B flows through the collector of the switching device Q2.

In this case, a resonance current I1 flowing through the primary-side series resonant capacitor Cr1 has sine waves as shown in FIG. 3C. When the resonance current I1 flows through the switching device Q1 in a negative direction, the resonance current I1 flows through the switching device Q2 in a positive direction. Thus, the switching devices Q1 and Q2 are alternately opened and closed repeatedly, whereby a driving current close to resonance current in waveform is supplied to the primary winding N1 of the isolation converter transformer PIT, and then a bridge output voltage V2 having a waveform as shown in FIG. 3H is obtained in the bridge rectifier diode DBR connected to the secondary winding N2.

As shown in FIG. 3D, a resonance current IC2 flows through the primary-side parallel resonant capacitor Cr2 connected in parallel with the switching device Q2 only in a short period when the switching device Q1 or Q2 is turned on or turned off. This indicates that a partial voltage resonance operation is obtained on the primary side by the switching devices Q1 and Q2 and the primary-side parallel resonant capacitor Cr2.

Further, when the switching device Q2 is turned off, a gate threshold voltage VGS(th) is supplied from the driving winding Ng provided on the primary side of the isolation converter transformer PIT to the auxiliary switching device Q3 connected in parallel with the primary-side series resonant capacitor Cr1 via the resistance Rg1 and the capacitor Cg.

The auxiliary switching device Q3 is turned on when the gate threshold voltage VGS(th) is higher than a predetermined voltage (for example 3.5 V), and is turned off when the gate threshold voltage VGS(th) is the predetermined voltage or lower. Hence, an on time T'ON of the auxiliary switching device Q3 is determined by the gate threshold voltage VGS(th) obtained from the driving winding Ng and a discharge time of a gate input capacitance Ciss of the auxiliary switching device Q3.

An induced voltage induced in the driving winding Ng is varied by voltage level of the alternating input voltage VAC and the load power Po, and is increased as the alternating input voltage VAC is raised or the load power Po is increased. Hence, the on time T'ON of the auxiliary switching device Q3 is controlled to be lengthened as the alternating input voltage VAC is raised or the load power Po is increased.

As a result, a drain-to-source voltage VQ3 of the auxiliary switching device Q3 and a drain current IQ3 of the auxiliary switching device Q3 at the alternating input voltage VAC= 100 V and the load power Po=200 W have waveforms as shown in FIGS. 3E and 3F, respectively. Further, since the capacitor Cr3 is connected in parallel with the primary-side series resonant capacitor Cr1 during the on time T'ON of the auxiliary switching device Q3, a resonance current waveform as shown in FIG. 3G is obtained.

On the other hand, as shown in FIGS. 4A to 4E, at the alternating input voltage VAC=100 V and the load power Po=25 W (light load) in a period TON during which the switching device Q2 is turned on and a period TOFF during which the switching device Q2 is turned off, the switching device Q2 has a collector-to-emitter voltage VQ2 having a waveform as shown in FIG. 4A, and a collector current IQ2 having a waveform as shown in FIG. 4B flows through the collector of the switching device Q2.

In this case, a resonance current I1 flowing through the primary-side series resonant capacitor Cr1 has sine waves as shown in FIG. 4C.

As shown in FIG. 4D, a resonance current IC2 flows through the primary-side parallel resonant capacitor Cr2 connected in parallel with the switching device Q2 only in a short period when the switching device Q1 or Q2 is turned on or turned off.

In this case, however, the gate threshold voltage VGS(th) obtained from the driving winding Ng of the isolation converter transformer PIT is the predetermined voltage (for example 3.5 V) or lower, and therefore the auxiliary switching device Q3 remains in an off state. This indicates that the on time T'ON of the auxiliary switching device Q3 is controlled to be changed according to the load power Po.

Figure 18:
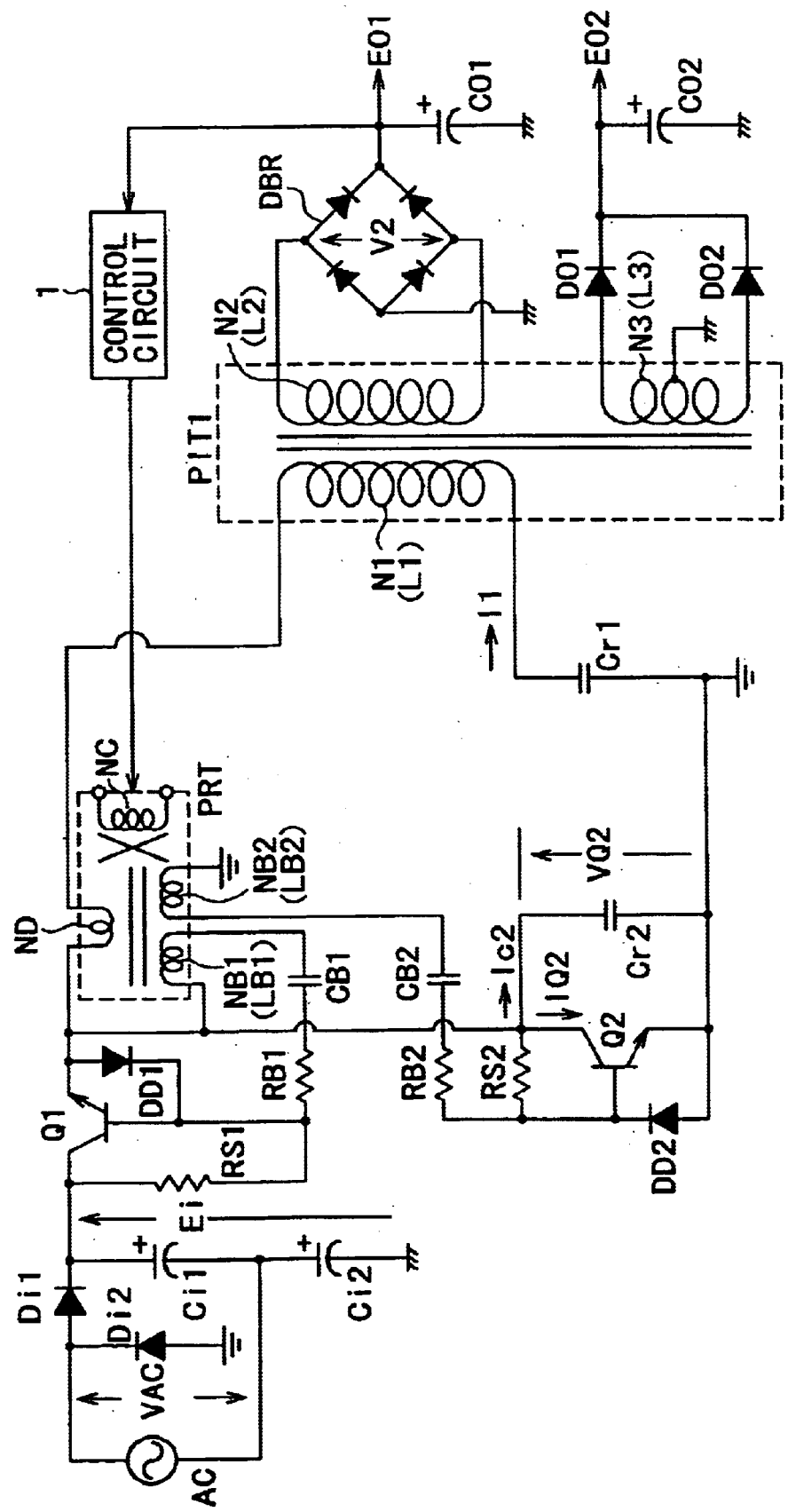
FIG. 18 is a circuit diagram showing a configuration of a prior art power supply circuit.

In the power supply circuit shown in FIG. 18, as described earlier, a capacitance value of the primary-side series resonant capacitor Cr1 is small so that a predetermined secondary-side direct-current output voltage E01 is obtained even at a low alternating input voltage VAC. Therefore, operation of the switching devices Q1 and Q2 at the time of turn-on or turn-off cannot be performed stably by ZVS and ZCS unless a gap G of about 0.5 mm to 1.0 mm is formed in the central magnetic leg of the isolation converter transformer PIT.

In the power supply circuit shown in FIG. 1, on the other hand, while the capacitance value of the primary-side series resonant capacitor Cr1 is small, the series circuit of the capacitor Cr3 and the auxiliary switching device Q3 is connected in parallel with the primary-side series resonant capacitor Cr1, and more than three times the capacitance value of the primary-side series resonant capacitor Cr1 is selected as the capacitance value of the capacitor Cr3.

With this arrangement, when the auxiliary switching device Q3 conducts at the time of turn-on or turn-off of the switching devices Q1 and Q2, the capacitor Cr3 having the large capacitance value is connected in parallel with the primary-side series resonant capacitor Cr1. Therefore, operation of the switching devices Q1 and Q2 at the time of turn-on or turn-off can be performed stably by ZVS and ZCS without a gap G being formed in the central magnetic leg of the isolation converter transformer PIT.

FIG. 5 shows characteristics of variations in AC-to-DC power conversion efficiency ηAC→DC, the switching frequency fs, the period TON of the switching device Q2, and the period TON of the auxiliary switching device Q3 when the load power Po of the secondary-side direct-current voltage E01 in the power supply circuit shown in FIG. 1 is varied from 0 W to 200 W.

As shown in FIG. 5, the switching frequency fs in the power supply circuit shown in FIG. 1 is controlled to be lowered as the load power Po is increased. Also, as the load power Po is increased, the period TON during which the switching device Q2 is on is lengthened, thus indicating that operation for constant-voltage control on the secondary-side direct-current output voltage E01 is performed.

Further, the period TON during which the auxiliary switching device Q3 is on is controlled to be lengthened, and thus the period during which the capacitor Cr3 is connected in parallel with the primary-side series resonant capacitor Cr1 at the time of turn-on or turn-off of the switching devices Q1 and Q2 is lengthened.

Since the gap G is not formed in the isolation converter transformer PIT in the power supply circuit according to the first embodiment shown in FIG. 1, it is possible to increase the number of turns of the primary winding N1 and hence reduce the resonance current I1.

Further, since the gap G of the isolation converter transformer PIT is reduced to zero, it is possible to prevent the primary winding N1 and the secondary winding N2 in the proximity of the gap from increasing the temperature due to an eddy current loss caused by a fringe magnetic flux.

As a result, the power supply circuit shown in FIG. 1 can improve the AC-to-DC power conversion efficiency ηAC→DC at the load power Po=200 W (heavy load) from about 91.8% to 92.5%. Also, the power conversion efficiency ηAC→DC at the load power Po=150 W, at which the best efficiency is obtained, can be improved from about 92.4% to 93.3%.

Thus, the power supply circuit shown in FIG. 1 can improve the AC-to-DC power conversion efficiency ηAC→DC by about 0.7% and reduce the alternating-current input power by about 0.7 W as compared with the prior art power supply circuit shown in FIG. 18.

In addition, a control range of the switching frequency fs of the switching devices Q1 and Q2 in the power supply circuit shown in FIG. 18 when the load is varied (Po=0 W to 200 W) is fs=56.8 KHz to 172.4 KHz, whereas the control range of the switching frequency fs is fs=61 KHz to 147 KHz in the power supply circuit shown in FIG. 1. Thus, the control range of the switching frequency fs can be reduced to about 75%.

Further, a control range of the switching frequency fs in the power supply circuit shown in FIG. 18 when the alternating input voltage is varied (VAC=90 V to 120 V) is fs=50 KHz to 69 KHz, whereas the control range of the switching frequency fs is fs=56 KHz to 70 KHz in the power supply circuit shown in FIG. 1. Thus, the control range of the switching frequency fs when the input voltage is varied can also be reduced to about 75%.

According to experiments, with the gap G of the isolation converter transformer PIT reduced to zero, the power supply circuit shown in FIG. 1 can increase the number of turns of the primary winding N1 from 45 T to 52 T. In this case, the power supply circuit can be realized by making selection such that the secondary winding N2=45 T; the primary-side series resonant capacitor Cr1 0.033 $\mu$F; the capacitor Cr3= 0.15 $\mu$F; the primary-side parallel resonant capacitor Cr2= 330 pF; the resistance Rg1=33 $\Omega$; the capacitor Cg=0.33 $\mu$F; and the driving winding Ng=1 T.

Figure 6:
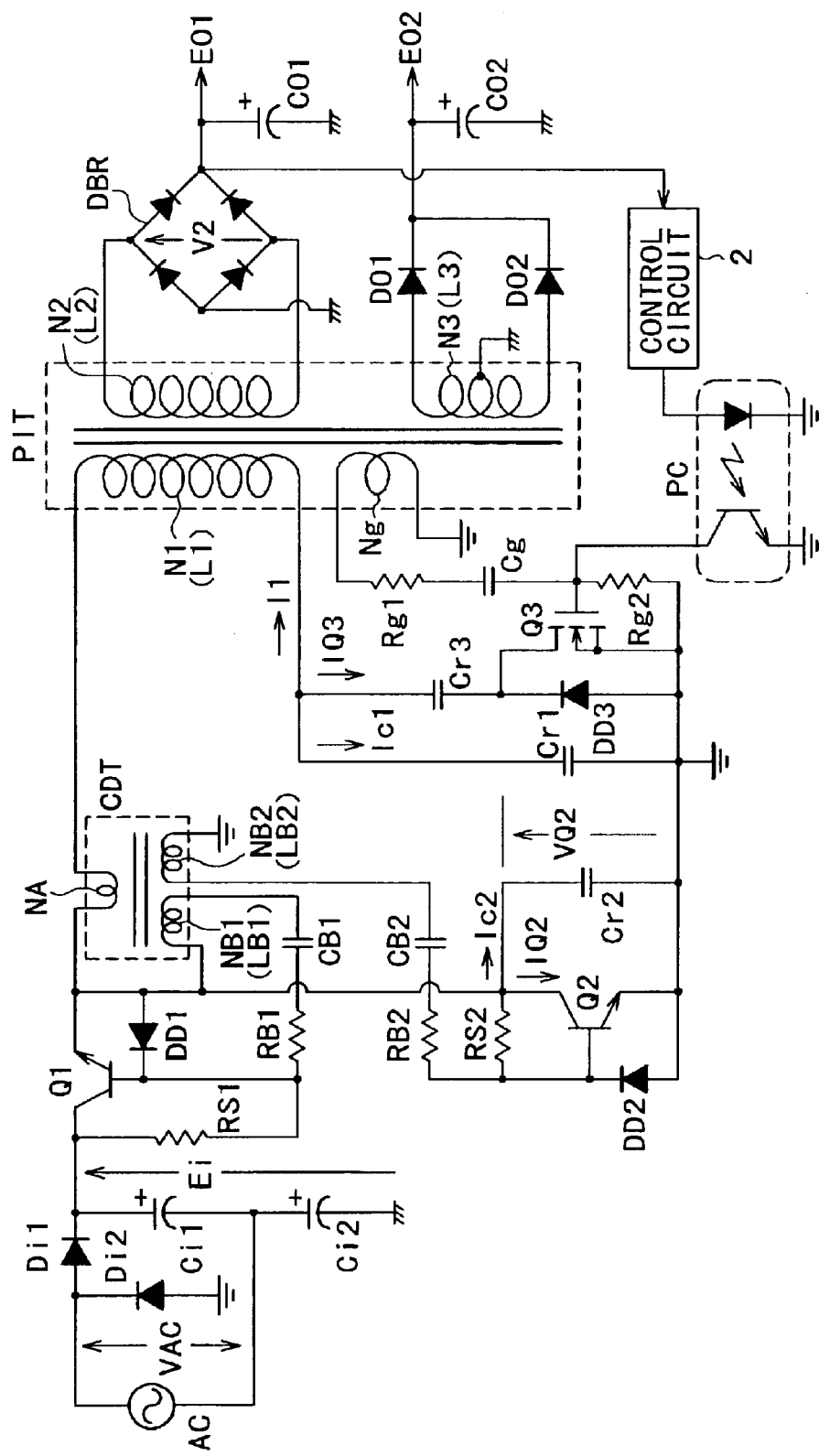
FIG. 6 is a circuit diagram showing an example of configuration of a power supply circuit according to a second embodiment of the present invention.

FIG. 6 is a diagram showing an example of circuit configuration of a switching power supply circuit according to a second embodiment of the present invention. The same parts as in FIG. 1 are identified by the same reference numerals, and their description will be omitted.

As with the power supply circuit shown in FIG. 1, the power supply circuit shown in FIG. 6 is configured such that no gap G is formed in a central magnetic leg of an E-E-shaped core of an isolation converter transformer PIT for transmitting switching output of switching devices Q1 and Q2 to a secondary side, and a series circuit of a capacitor Cr3 and an auxiliary switching device Q3 is connected in parallel with a primary-side series resonant capacitor Cr1.

However, the power supply circuit shown in FIG. 6 is different from the power supply circuit shown in FIG. 1 in that the power supply circuit shown in FIG. 1 effects constant-voltage control by controlling the switching frequency fs of the switching devices Q1 and Q2 by means of the orthogonal type control transformer PRT, whereas the power supply circuit shown in FIG. 6 effects constant-voltage control by controlling a conduction angle of the auxiliary switching device Q3 without controlling the switching frequency by means of the orthogonal type control transformer PRT.

The power supply circuit shown in FIG. 6 is therefore provided with a converter transformer CTD in place of the orthogonal type control transformer PRT provided for constant-voltage control in the power supply circuit shown in FIG. 1. Incidentally, the converter transformer CTD is of much smaller size and lighter weight than the orthogonal type control transformer PRT.

A control circuit 2 in this case is for example configured to supply a PWM control signal (error voltage signal) corresponding to level of a direct-current output voltage E01 to a gate of the auxiliary switching device Q3 via a photocoupler PC.

Thus the control circuit 2 is connected with an anode of a photodiode of the photocoupler PC. A phototransistor of the photocoupler PC is connected to the gate of the auxiliary switching device Q3.

The constant-voltage control by the auxiliary switching device Q3 in the power supply circuit shown in FIG. 6 is as follows.

In this case, a current flowing from the control circuit 2 to the photodiode of the photocoupler PC is changed according to the level of the secondary-side direct-current output voltage E01. This results in a change in level of a current flowing in the primary-side phototransistor, and consequently voltage level of the gate of the auxiliary switching device Q3 can be changed.

When the conduction angle of the auxiliary switching device Q3 is controlled by the gate voltage thus changed according to the level of the secondary-side direct-current output voltage E01, the on period T'ON of the auxiliary switching device Q3 can be varied according to the level of the secondary-side direct-current output voltage E01. Thereby capacitance of the series resonant circuit including the capacitor Cr3 and the primary-side series resonant capacitor Cr1 is varied. Consequently resonance impedance of the primary-side series resonant circuit is changed, whereby constant-voltage control can be effected by the auxiliary switching device Q3.

That is, the power supply circuit shown in FIG. 6 effects the constant-voltage control on the secondary-side direct-current output voltage E01 using the auxiliary switching device Q3 of the series circuit provided for stable ZVS and ZCS of the switching devices Q1 and Q2.

FIGS. 7A, 7B, 7C, 7D, and 7E are waveform charts showing operation of main parts in the power supply circuit shown in FIG. 6.

Operating waveforms of the power supply circuit shown in FIG. 6 at an alternating input voltage VAC=100 V and a load power Po=200 W (heavy load) are substantially the same as the waveforms of FIGS. 3A to 3H. Therefore, in this case, only operating waveforms at an alternating input voltage VAC=100 V and a load power Po=25 W (light load) are shown.

As shown in FIGS. 7A to 7E, in the power supply circuit shown in FIG. 6, at the alternating input voltage VAC=100 V and the load power Po=25 W (light load) in a period TON during which the switching device Q2 is turned on and a period during which the switching device Q2 is turned off, the switching device Q2 has a collector-to-emitter voltage VQ2 having a waveform as shown in FIG. 7A, and a collector current IQ2 having a waveform as shown in FIG. 7B flows through the collector of the switching device Q2.

In this case, a primary-side direct-current resonance current I1 flowing through the primary-side series resonant capacitor Cr1 has sine waves as shown in FIG. 7C.

A drain-to-source voltage VQ3 and a drain current IQ3 of the auxiliary switching device Q3 of the series circuit connected in parallel with the primary-side series resonant capacitor Cr1 have waveforms as shown in FIGS. 7D and 7E, respectively. The on period T'ON of the auxiliary switching device Q3 is as shown in the figures.

Thus, as is understood from a comparison of the operating waveforms (FIGS. 7A to 7E) of the power supply circuit shown in FIG. 6 at light load with the operating waveforms (FIGS. 4A to 4E) of the power supply circuit shown in FIG. 1 at light load, the power supply circuit shown in FIG. 6 has a conduction period T'ON during which the auxiliary switching device Q3 conducts even at the light load power Po, and controls the conduction period T'ON of the auxiliary switching device Q3 by a control voltage from the control circuit 2, the control voltage corresponding to the level of the secondary-side direct-current output voltage E01.

As is understood from the operating waveform shown in FIGS. 3A to 3H, switching operation of the switching devices Q1 and Q2 in the power supply circuit shown in FIG. 6 is ZVS operation and ZCS operation that are substantially the same as switching operation of the switching devices Q1 and Q2 in the power supply circuit shown in FIG. 18.

Specifically, in the case of the power supply circuit formed as shown in FIG. 6, even when a small value is selected as a capacitance value of the primary-side series resonant capacitor Cr1, the auxiliary switching device Q3 conducts to connect the capacitor Cr3 in parallel with the primary-side series resonant capacitor Cr1 at the time of turn-on or turn-off of the switching devices Q1 and Q2. Thus, when for example more than three times the capacitance value of the primary-side series resonant capacitor Cr1 is selected as the capacitance value of the capacitor Cr3, operation of the switching devices Q1 and Q2 at the time of turn-on or turn-off is performed stably by ZVS and ZCS without a gap G being formed in the central magnetic leg of the isolation converter transformer PIT.

According to experiments, with the gap G of the isolation converter transformer PIT reduced to zero, the power supply circuit shown in FIG. 6 can be realized by making selection such that the number of turns of a primary winding N1=52 T; the number of turns of a secondary winding N2=45 T; the primary-side series resonant capacitor Cr1=0.022 $\mu$F; the capacitor Cr3=0.15 $\mu$F; and a primary-side parallel resonant capacitor Cr2=330 pF.

FIG. 8 shows characteristics of variations in AC-to-DC power conversion efficiency $\eta$AC→DC, switching frequency fs, the period TON of the switching device Q2, and the period T'ON of the auxiliary switching device Q3 in this case with respect to load power Po (0 W to 200 W).

As shown in FIG. 8, the switching frequency fs in the power supply circuit shown in FIG. 6 is controlled to be lowered as the load power Po is increased. Also, as the load power Po is increased, the period TON during which the switching device Q2 is on and the period T'ON during which the auxiliary switching device Q3 is on are controlled to be lengthened.

As with the power supply circuit shown in FIG. 1, the power supply circuit shown in FIG. 6 can increase the number of turns of the primary winding N1 of the isolation converter transformer PIT from a conventional 45 T to 52 T. Therefore, as a result of the increase in the number of turns of the primary winding N1, it is possible to reduce the resonance current I1, and since the gap G of the isolation converter transformer PIT is reduced to zero, it is possible to prevent the primary winding N1 and the secondary winding N2 in the proximity of the gap from increasing the temperature due to an eddy current loss caused by a fringe magnetic flux.

Thereby the power conversion efficiency $\eta$AC→DC at the load power Po=200 W can be improved from about 91.8% to 92.5%.

Also, the power conversion efficiency $\eta$AC→DC at the load power Po=150 W, at which the best efficiency is obtained, can be improved from about 92.4% to 93.0%.

The on period T'ON of the auxiliary switching device Q3 at the load power Po of 0 W to 200 W is 4 $\mu$s to 2 $\mu$s, and correspondingly the switching frequency fs changes in a range of fs=71.4 KHz to 96.2 KHz. Hence, a control range of the switching frequency fs can be reduced to about 21.5% of that of the power supply circuit shown in FIG. 18.

Further, a control range of the switching frequency fs of the switching devices Q1 and Q2 in the power supply circuit shown in FIG. 18 at the alternating input voltage VAC of 90 V to 120 V is 50 KHz to 69 KHz, whereas the control range of the switching frequency fs is 73.5 KHz to 65.8 KHz in the power supply circuit shown in FIG. 6. Thus, the control range of the switching frequency fs can be reduced to about 46%.

Figure 9:
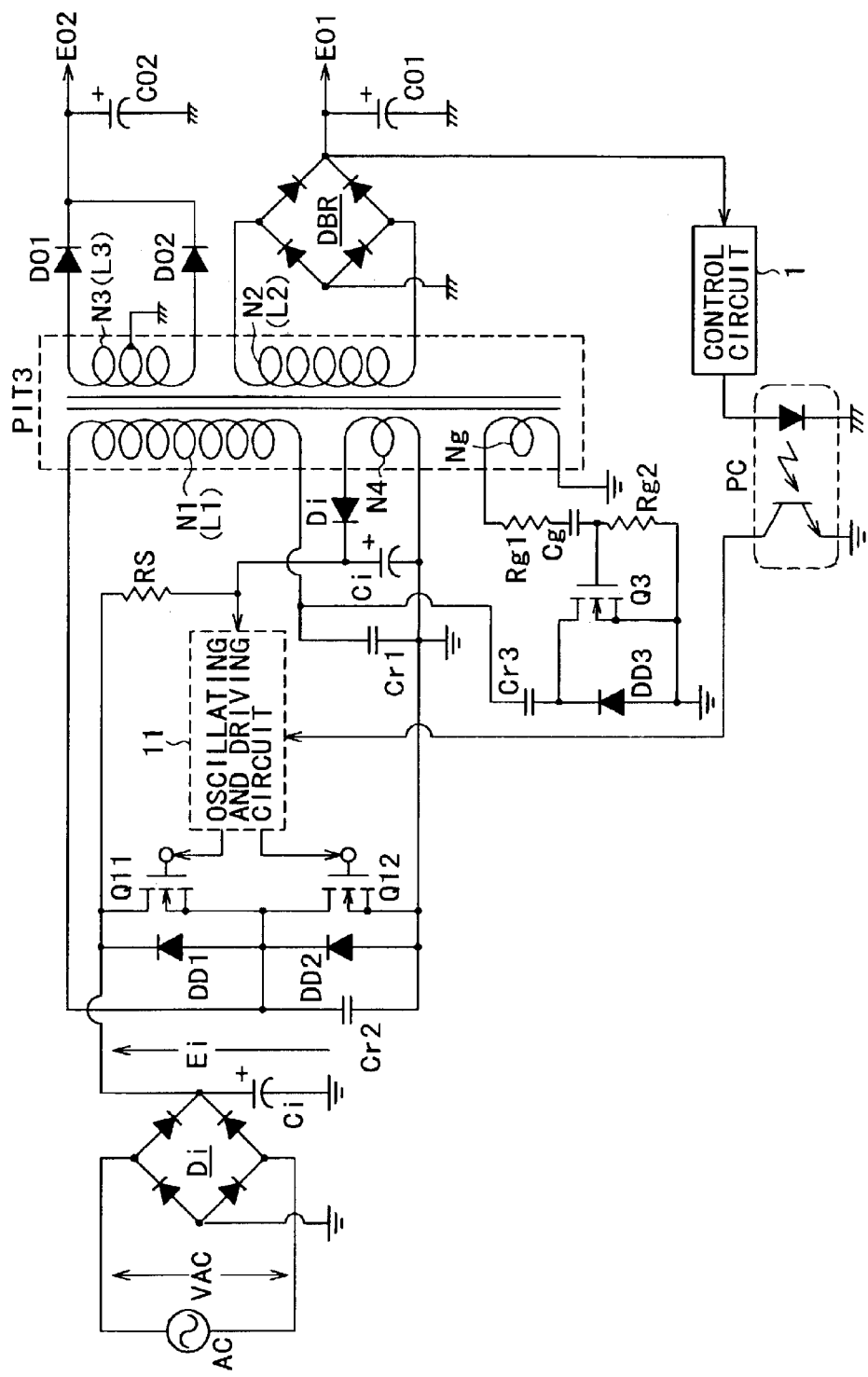
FIG. 9 is a circuit diagram showing an example of configuration of a power supply circuit according to a third embodiment of the present invention.

FIG. 9 is a diagram showing an example of circuit configuration of a switching power supply circuit according to a third embodiment of the present invention. The same parts as in FIG. 6 are identified by the same reference numerals, and their description will be omitted.

The power supply circuit shown in FIG. 9 is also provided with a current resonance type converter in which two switching devices Q11 and Q12 are coupled by half-bridge coupling. However, the power supply circuit shown in FIG. 9 is different from the power supply circuit shown in FIG. 1 in that a driving system for the current resonance type converter of the power supply circuit shown in FIG. 9 is an external excitation system. In this case, a MOS-FET or an IGBT (Insulated Gate Bipolar Transistor) is used as the switching devices Q11 and Q12.

In this case, a rectifying and smoothing circuit formed by a bridge rectifier circuit Di and a smoothing capacitor Ci rectifies and smoothes an alternating input voltage VAC of an alternating-current power supply AC, and thereby generates a direct-current input voltage equal to a peak value of the alternating input voltage VAC multiplied by unity, for example.

Gates of the switching devices Q11 and Q12 are connected to an oscillating and driving circuit 11. In this case, the oscillating and driving circuit 11 is supplied with a starting voltage via a starting resistance RS, and supplied with a smoothed output, as a driving voltage therefor, obtained by smoothing an output of a winding N4 wound additionally on the primary side of an isolation converter transformer PIT3 by a capacitor C1.

The switching device Q11 has a drain connected to a positive electrode of the smoothing capacitor Ci, and a source connected to a primary-side ground via a primary winding N1 and a primary-side series resonant capacitor Cr1. The switching device Q12 has a drain connected to the source of the switching device Q11, and a source connected to the primary-side ground.

Also in this case, a primary-side parallel resonant capacitor Cr2 is connected in parallel with the drain and the source of the switching device Q12.

Further, a clamp diode DD1 is connected in parallel with the drain and the source of the switching device Q11, and a clamp diode DD2 is connected in parallel with the drain and the source of the switching device Q12.

In this case, a control circuit 1 supplies a current or a voltage varied in level according to variation in a direct-current output voltage E01 to the oscillating and driving circuit 11 on the primary side via a photocoupler PC. In order to stabilize the direct-current output voltage E01, the oscillating and driving circuit 11 outputs a switching driving signal (voltage) varied in cycle according to the level of the output from the control circuit 1 to the gates of the switching devices Q11 and Q12 alternately. Thereby switching frequency fs of the switching devices Q11 and Q12 is varied. The switching devices Q11 and Q12 driven by the oscillating and driving circuit 11 thereby stabilize the direct-current output voltage E01 as described earlier with reference to FIG. 1.

Consequently, such a configuration provides similar effects to those of the power supply circuit shown in FIG. 1. As compared with the power supply circuit shown in FIG. 18, AC-to-DC power conversion efficiency $\eta$AC→DC is improved by about 0.5%, and the alternating input voltage VAC can be reduced by about 0.6 W. Thus, the AC-to-DC power conversion efficiency ηAC→DC is improved also when the power supply circuit shown in FIG. 1 obtains a direct-current input voltage by subjecting the alternating input voltage VAC to full-wave rectification by the bridge rectifier circuit Di and the smoothing capacitor Ci.

In addition, though not shown, a configuration obtained by converting the self-excited power supply circuit shown in FIG. 6 into an externally excited power supply circuit provides similar effects to those of the power supply circuit shown in FIG. 1. Also in this case, as compared with the power supply circuit shown in FIG. 18, the AC-to-DC power conversion efficiency ηAC→DC is improved by about 0.4%, and the alternating input voltage VAC can be reduced by about 0.5 W. The AC-to-DC power conversion efficiency ηAC→DC is improved also when the power supply circuit shown in FIG. 6 obtains a direct-current input voltage by subjecting the alternating input voltage VAC to full-wave rectification by the bridge rectifier circuit Di and the smoothing capacitor Ci.

Figure 10:
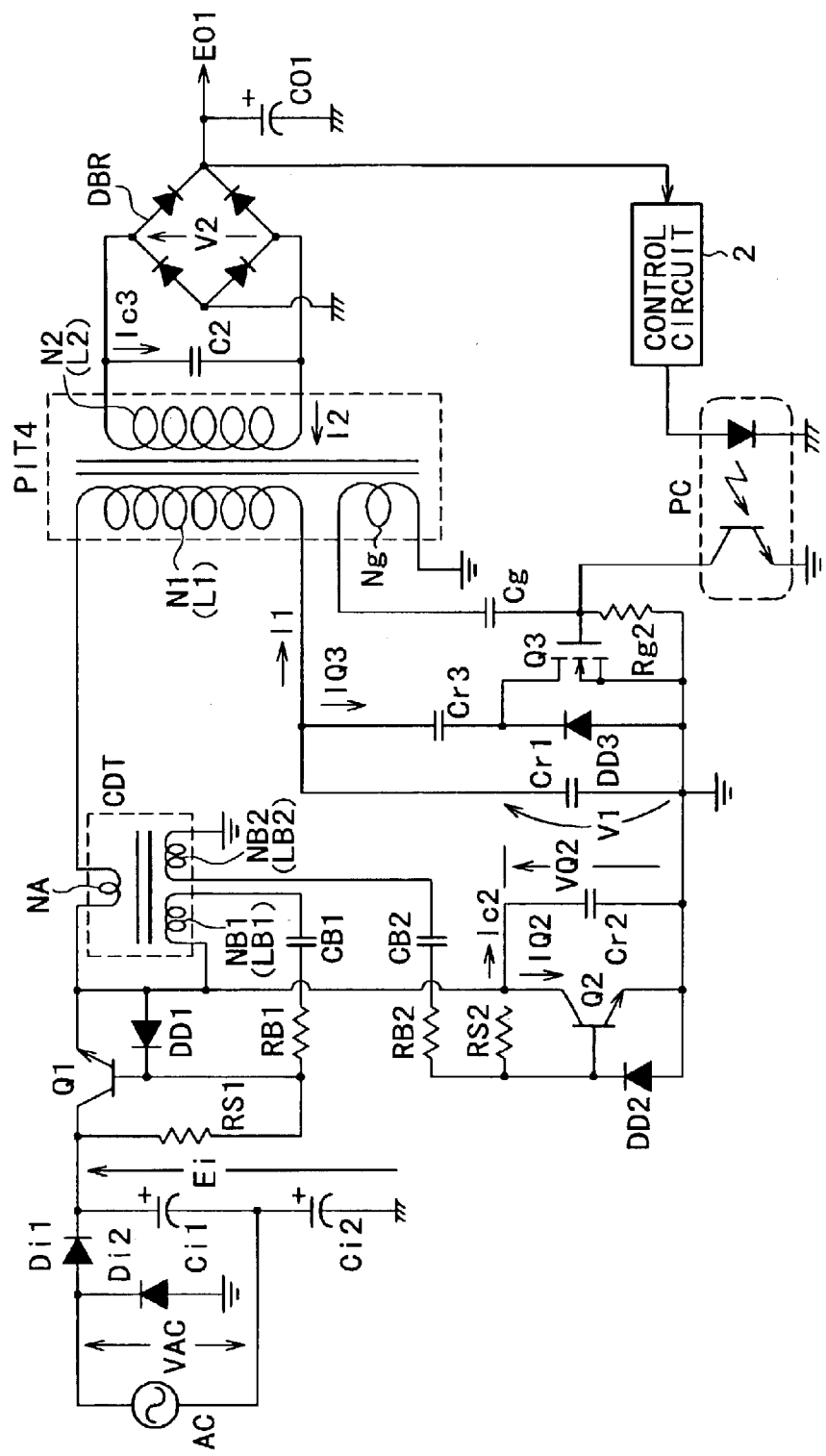
FIG. 10 is a circuit diagram showing an example of configuration of a power supply circuit according to a fourth embodiment of the present invention.

FIG. 10 is a diagram showing an example of circuit configuration of a switching power supply circuit according to a fourth embodiment of the present invention. The same parts as in FIG. 6 are identified by the same reference numerals, and their description will be omitted.

The power supply circuit shown in FIG. 10 is also configured such that no gap G is formed in a central magnetic leg of an E-E-shaped core of an isolation converter transformer PIT4 for transmitting switching output of switching devices Q1 and Q2 to a secondary side, and a series circuit of a capacitor Cr3 and an auxiliary switching device Q3 is connected in parallel with a primary-side series resonant capacitor Cr1. Further, a control circuit 2 controls a conduction angle of the auxiliary switching device Q3 via a photocoupler PC.

However, the power supply circuit shown in FIG. 10 is different from the power supply circuit shown in FIG. 6 in that the power supply circuit shown in FIG. 10 has a secondary-side parallel resonant capacitor C2 for secondary-side partial voltage resonance which capacitor is connected in parallel with a secondary winding N2 of the isolation converter transformer PIT4.

In addition, the power supply circuit shown in FIG. 10 is different from the power supply circuit shown in FIG. 6 in that while more than three times the capacitance value of the primary-side series resonant capacitor Cr1 is selected as the capacitance value of the capacitor Cr3 in the power supply circuit shown in FIG. 6, the capacitance value of the primary-side series resonant capacitor Cr1 and the capacitor Cr3 in the power supply circuit shown in FIG. 10 is selected such that primary-side resonance frequency of the primary-side resonant circuit at heavy load is 70 KHz or less, for example. The secondary-side parallel resonant capacitor C2 is formed by a film capacitor, for example.

Thus, the power supply circuit shown in FIG. 10 employs a configuration of a "complex resonance type switching converter," in which a primary-side current resonant circuit is provided with a primary-side partial voltage resonance circuit and a secondary-side partial voltage resonance circuit.

Constant-voltage control of the power supply circuit shown in FIG. 10 is as follows.

In this case, as in the power supply circuit shown in FIG. 6, a current flowing from a control circuit 2 to a photodiode of the photocoupler PC is changed according to the level of a secondary-side direct-current output voltage E01. This results in a change in level of a current flowing in a phototransistor on the primary side, and consequently voltage level of the gate of the auxiliary switching device Q3 can be changed. Thereby capacitance of the series resonant circuit including the capacitor Cr3 and the primary-side series resonant capacitor Cr1 is varied. Consequently resonance impedance of the primary-side series resonant circuit is changed, whereby constant-voltage control can be effected by the auxiliary switching device Q3.

When the conduction angle of the auxiliary switching device Q3 is controlled by the gate voltage thus changed according to the level of the secondary-side direct-current output voltage E01, the on period T'ON of the auxiliary switching device Q3 can be varied according to the level of the secondary-side direct-current output voltage E01. Thereby the capacitance of the series resonant circuit including the capacitor Cr3 and the primary-side series resonant capacitor Cr1 is varied.

Consequently the resonance impedance of the primary-side series resonant circuit is changed, whereby constant-voltage control can be effected by the auxiliary switching device Q3.

However, the power supply circuit shown in FIG. 10 is provided with the secondary-side parallel resonant capacitor C2 on the secondary side of the isolation converter transformer PIT4. As a load on the secondary side becomes lighter, the parallel resonant circuit on the secondary side of the isolation converter transformer PIT4 produces an effect on the resonance impedance of the primary-side series resonant circuit, whereby a resonance current flowing through a resonance current detecting winding ND of a converter transformer CTD is changed. Consequently, the switching frequency fs of the switching devices Q1 and Q2 is changed.

Thus, the power supply circuit shown in FIG. 10 effects constant-voltage control by controlling the conduction angle of the auxiliary switching device Q3 at the time of heavy load, and effects constant-voltage control by complex operation that combines the variable control of the switching frequency fs of the switching devices Q1 and Q2 with the control of the conduction angle of the auxiliary switching device Q3 at the time of light load.

FIGS. 11A, 11B, 11C, 11D, 11E, 11F, 11G, and 11H are waveform charts showing operation of main parts in the power supply circuit shown in FIG. 10.

FIGS. 11A to 11H show operating waveforms at an alternating input voltage VAC=100 V and a load power Po=200 W (heavy load).

As shown in 11A to 11H, also in the power supply circuit shown in FIG. 10, in a period TON during which the switching device Q2 is turned on and a period during which the switching device Q2 is turned off, the switching device Q2 has a collector-to-emitter voltage VQ2 having a waveform as shown in FIG. 11A, and a collector current IQ2 having a waveform as shown in FIG. 11B flows through the collector of the switching device Q2.

In this case, a resonance current I1 flowing through the primary-side series resonant capacitor Cr1 has a waveform as shown in FIG. 1C. When the resonance current I1 flows through the switching device Q1 in a negative direction, the resonance current I1 flows through the switching device Q2 in a positive direction.

A voltage V1 across the primary-side series resonant capacitor Cr1 and a drain current IQ3 of the auxiliary switching device Q3 have waveforms as shown in FIGS. 11D and 11E, respectively.

Since the secondary-side parallel resonant capacitor C2 is connected on the secondary side of the isolation converter transformer PIT4, a resonance current IC3 as shown in FIG. 11G flows through the secondary-side parallel resonant capacitor C2 in timing in which polarity of a bridge output voltage V2 of a bridge rectifier diode DBR as shown in FIG. 11H is reversed. This indicates partial voltage resonance operation obtained on the secondary side of the isolation converter transformer PIT4. As a result, a secondary-side current I2 flowing on the secondary side of the isolation converter transformer PIT4 has a waveform as shown in FIG. 11F.

As is understood from the operating waveforms shown in FIGS. 11A to 11H, switching operation of the switching devices Q1 and Q2 in the power supply circuit shown in FIG. 10 is ZVS operation and ZCS operation that are substantially the same as switching operation of the switching devices Q1 and Q2 in the power supply circuit shown in FIG. 18. Hence, also in this case, operation of the switching devices Q1 and Q2 at the time of turn-on or turn-off can be performed stably by ZVS and ZCS without a gap G being formed in the central magnetic leg of the isolation converter transformer PIT4.

Further, with the secondary-side parallel resonant capacitor C2 connected in parallel with the secondary winding N2 of the isolation converter transformer PIT4, the power supply circuit shown in FIG. 10 can reduce a peak value of the resonance current I1 (FIG. 1C) to about 68% of the resonance current IT of the power supply circuit shown in FIG. 18.

That is, with the secondary-side parallel resonant capacitor C2 connected in parallel with the secondary winding N2 of the isolation converter transformer PIT4 and even with the gap G of the isolation converter transformer PIT4 reduced to zero, the switching devices Q1 and Q2 in the power supply circuit shown in FIG. 10 can stably perform ZVS operation or ZCS operation even when the alternating input voltage VAC or load power Po is varied. Also, the primary-side direct-current resonance current I1 flowing on the primary side and peak values of currents flowing through the switching devices Q1 and Q2 are reduced.

FIG. 12 shows characteristics of variations in AC-to-DC power conversion efficiency ηAC→DC, switching frequency fs, the period TON of the switching device Q2, and the period T'ON of the auxiliary switching device Q3 when the load power Po of the secondary-side direct-current voltage E01 in the power supply circuit shown in FIG. 10 is varied from 0 W to 200 W.

As shown in FIG. 12, in a range of the load power Po of 200 W (heavy load) to 100 W in the power supply circuit shown in FIG. 10, the switching frequency fs is substantially constant at 72 KHz, and the on period T'ON of the auxiliary switching device Q3 is controlled to be long.

In a range of the load power Po of 100 W to 25 W, the switching frequency fs is varied sharply, and correspondingly the on period T'ON of the auxiliary switching device Q3 is controlled to be shortened sharply.

This indicates that, as described earlier, the power supply circuit shown in FIG. 10 effects constant-voltage control by controlling the conduction angle of the auxiliary switching device Q3 at the time of heavy load, and effects constant-voltage control on the secondary-side direct-current output voltage E01 by the variable control of the switching frequency fs of the switching devices Q1 and Q2 and the control of the conduction angle of the auxiliary switching device Q3 at the time of light load.

Thus, since the primary-side direct-current resonance current IT is reduced and the gap G of the isolation converter transformer PIT4 is reduced to zero, the power supply circuit shown in FIG. 10 can prevent a primary winding N1 and the secondary winding N2 in the proximity of the gap from increasing the temperature due to an eddy current loss caused by a fringe magnetic flux.

Thereby the power conversion efficiency ηAC→DC at the load power Po=200 W can be improved from about 91.8% to 92.8%.

Also, the power conversion efficiency ηAC→DC at the load power Po=50 W can be improved from about 87.0% to 90.0%.

Thus, as compared with the power supply circuit shown in FIG. 18, the power supply circuit shown in FIG. 10 improves the AC-to-DC power conversion efficiency n AC DC by about 1.0%, and reduces the alternating-current input power by about 2.4 W.

Figure 19:
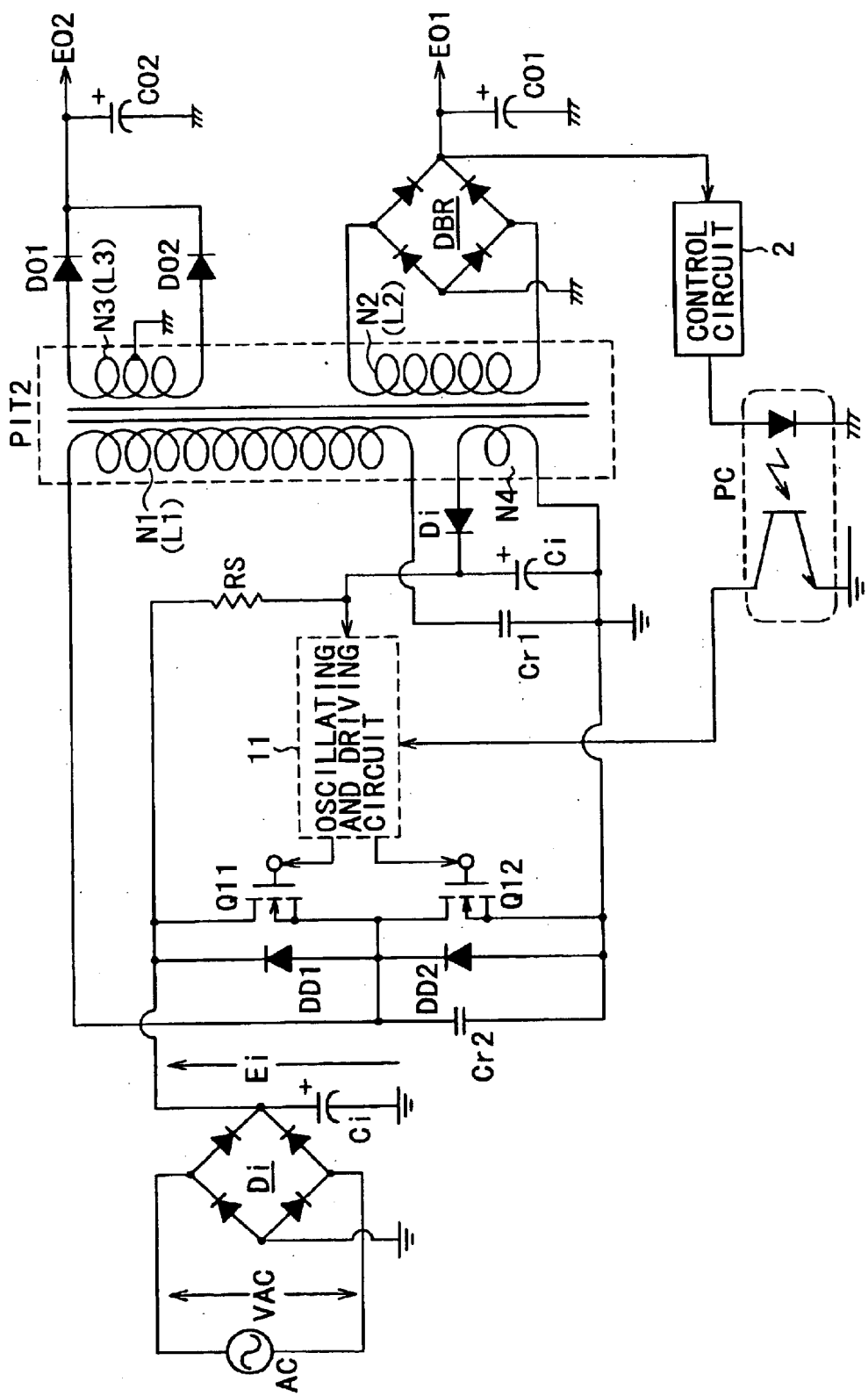
FIG. 19 is a circuit diagram showing another configuration of a prior art power supply circuit.

When the input rectifier circuit of the power supply circuit shown in FIG. 10 is formed by a full-wave rectifier circuit as shown in FIG. 19, the AC-to-DC power conversion efficiency ηAC→DC is improved by about 2.0% and the alternating-current input power is reduced by about 3.0 W.

The switching frequency fs of the auxiliary switching device Q3 at the load power Po of 0 W to 200 W in the power supply circuit shown in FIG. 18 is controlled to be changed by about 107 KHz, whereas the switching frequency fs of the power supply circuit shown in FIG. 10 is controlled to be changed by about 25 KHz. Thus the control range of the switching frequency fs can be reduced to about 23.3% of that of the power supply circuit of FIG. 18.

According to experiments, in the power supply circuit shown in FIG. 18, primary-side series resonance frequency is about 50 KHz. In order to stabilize the secondary-side direct-current output voltage E01 at 135 V at the minimum alternating input voltage VAC=90 V and the maximum load power Pomax=200 W, the switching frequency fs needs to be 53 KHz. Hence, unless the primary-side series resonant capacitor Cr1=0.056 $\mu$F and the gap G of the isolation converter transformer PIT1 is 1 mm to 2 mm, operation of the switching devices Q1 and Q2 at the time of turn-on or turn-off cannot be performed by ZVS and ZCS.

On the other hand, the power supply circuit shown in FIG. 10 can reduce the gap G of the isolation converter transformer PIT4 to zero. Therefore, when selection is made such that the primary winding N1 and the secondary winding N2=45 T; the primary-side series resonant capacitor Cr1= 0.022 $\mu$F; a primary-side parallel resonant capacitor Cr2= 680 pF; the capacitor Cr3=6800 pF; and a secondary-side parallel resonant capacitor Cr4=0.047 $\mu$F, the operation of the switching devices Q1 and Q2 at the time of turn-on or turn-off can be performed by ZVS and ZCS.

Figure 13A:
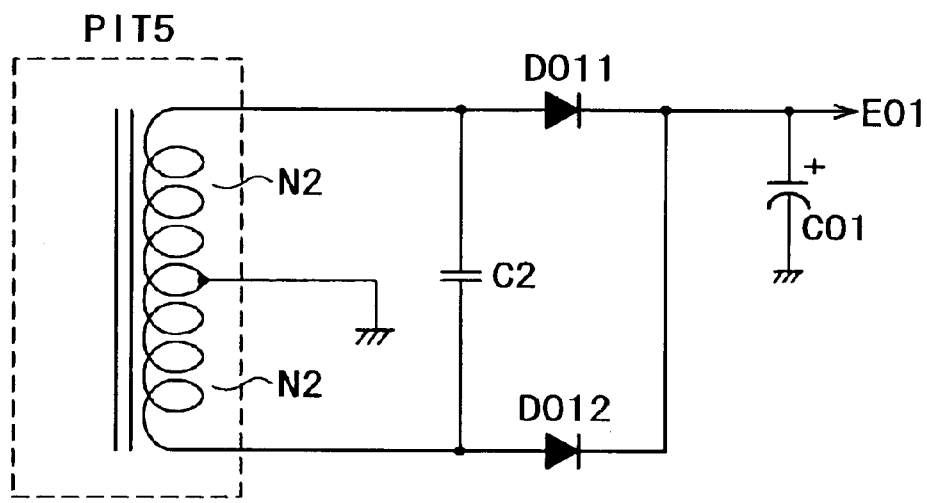
FIGS. 13A and 13B are diagrams showing other examples of configuration of a secondary-side rectifier circuit of the power supply circuit according to the fourth embodiment.
Figure 13B:
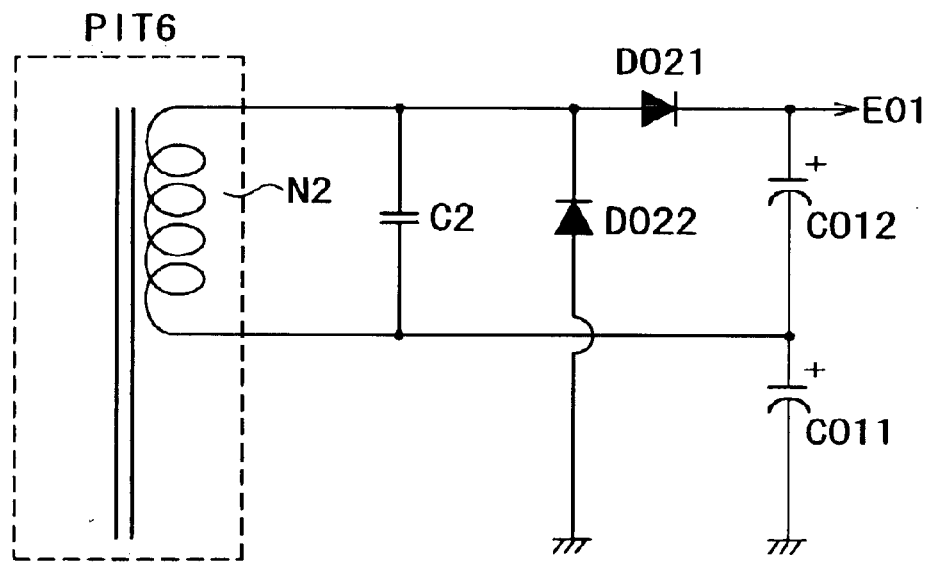

FIGS. 13A and 13B are diagrams showing other examples of configuration of the secondary-side circuit of the power supply circuit shown in FIG. 10.

A secondary-side circuit shown in FIG. 13A has a center tap provided for a secondary winding N2 of an isolation converter transformer PIT5, and has rectifier diodes D011 and D012 and a smoothing capacitor C01 connected to the secondary winding N2 as shown in the figure, whereby a full-wave rectifier circuit is formed to generate a secondary-side direct-current output voltage E01. The secondary-side circuit thus formed can reduce capacitance of a secondary-side parallel resonant capacitor C2 connected in parallel with the secondary winding N2 of the isolation converter transformer PIT5 to 1500 pF.

A secondary-side circuit shown in FIG. 13B has rectifier diodes D021 and D022 and smoothing capacitors C011 and C012 connected to a secondary winding N2 of an isolation converter transformer PIT6 as shown in the figure, whereby a voltage doubler rectifier circuit is formed to generate a secondary-side direct-current output voltage E01. When the secondary-side circuit is thus formed, capacitance of a secondary-side parallel resonant capacitor C2 is increased to 0.022 $\mu$F, but the number of turns of the secondary winding N2 can be reduced to 23 T.

In addition, though not shown, a configuration obtained by converting the self-excited power supply circuit shown in FIG. 10 into an externally excited power supply circuit provides similar effects to those of the power supply circuit shown in FIG. 10. However, in the case of the externally excited power supply circuit, the switching frequency fs of the switching devices Q1 and Q2 is fixed; therefore even at light load, constant-voltage control is effected by controlling the conduction angle of the auxiliary switching device Q3.

Figure 14:
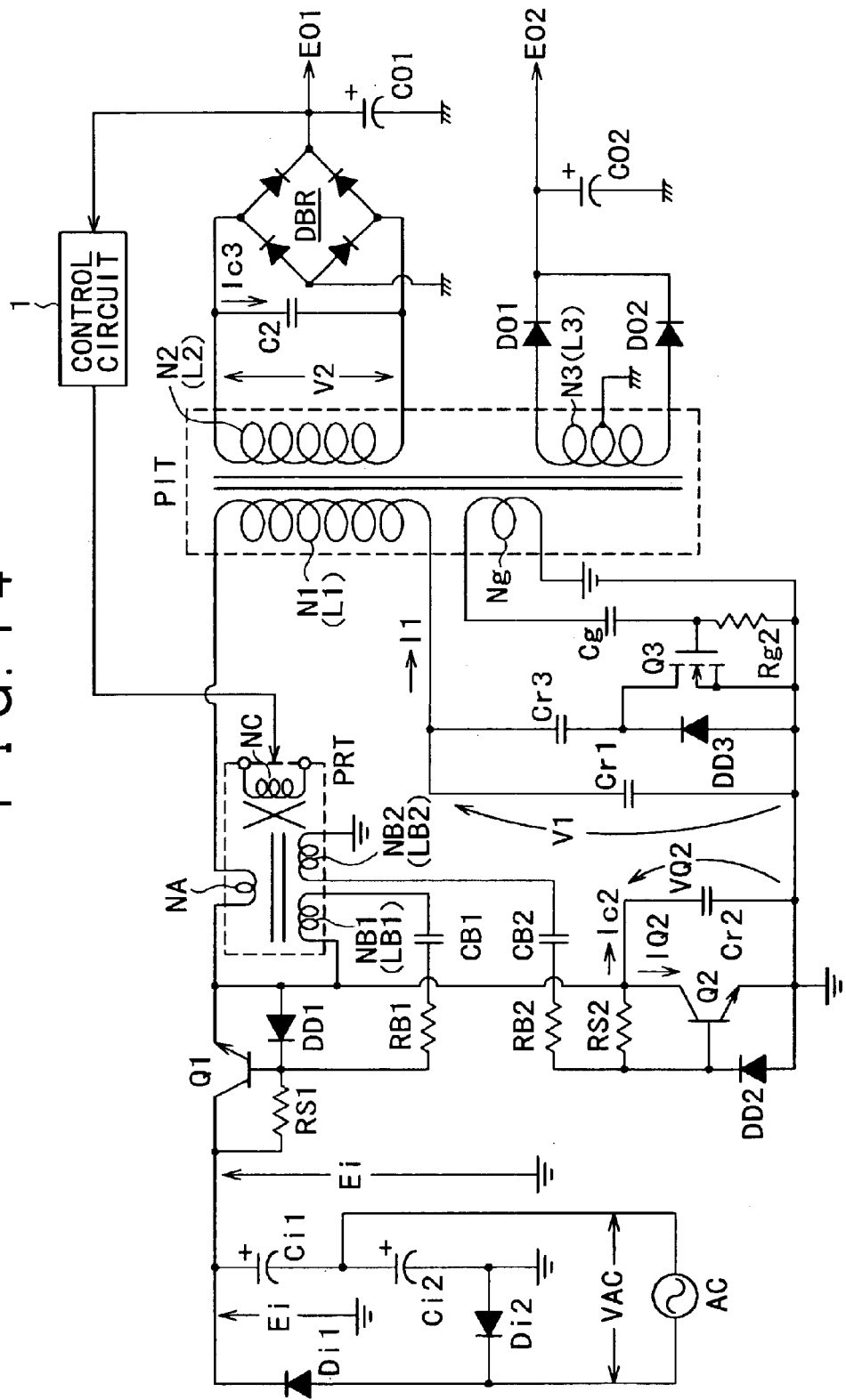
FIG. 14 is a circuit diagram showing an example of configuration of a power supply circuit according to a fifth embodiment of the present invention.
Figure 15:
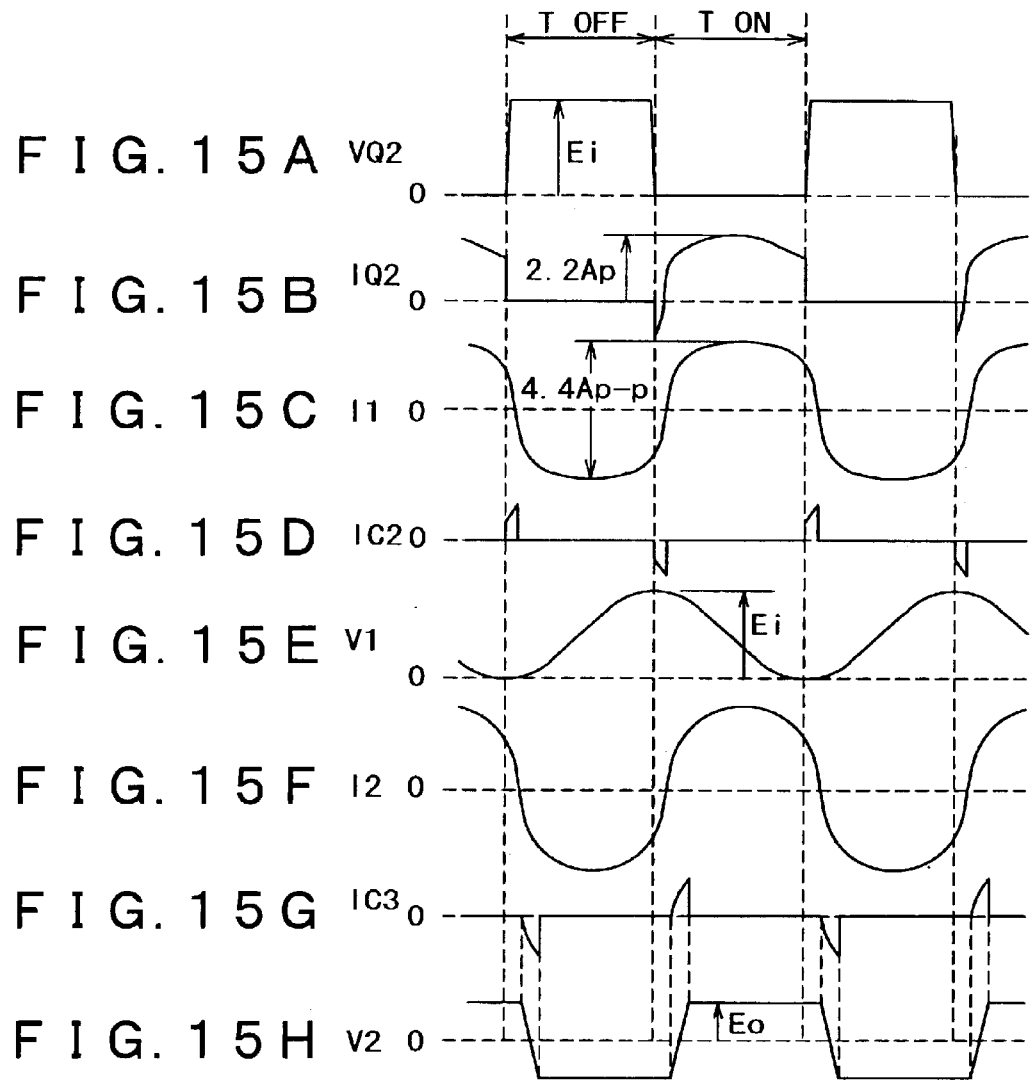
FIGS. 15A, 15B, 15C, 15D, 15E, 15F, 15G, and 15H are waveform charts showing operation of the power supply circuit according to the fifth embodiment.

FIG. 14 shows an example of circuit configuration of a switching power supply circuit according to a fifth embodiment of the present invention. The same parts as in the power supply circuits according to the embodiments described thus far are identified by the same reference numerals, and their description will be omitted.

As with the power supply circuit shown in FIG. 10, the switching power supply circuit according to the fifth embodiment shown in FIG. 14 employs a configuration of a "complex resonance type switching converter," in which a primary-side current resonant circuit is provided with a primary-side partial voltage resonance circuit and a secondary-side partial voltage resonance circuit. Also, as with the power supply circuit shown in FIG. 10, the capacitance value of a primary-side series resonant capacitor Cr1 and a capacitor Cr3 in the power supply circuit shown in FIG. 14 is selected such that primary-side resonance frequency of the primary-side resonant circuit at heavy load is 70 KHz or less, for example.

However, as with the power supply circuit shown in FIG. 1, the power supply circuit shown in FIG. 14 is provided with a control circuit 1 and an orthogonal type control transformer PRT (Power Regulating Transformer) as shown in the figure as a constant-voltage control circuit system for secondary-side direct-current output voltage E01.

Specifically, as in the case of FIG. 1, constant-voltage control operation of the power supply circuit shown in FIG. 14 variably controls inductance LB1 of a driving winding NB1 wound in the orthogonal type control transformer PRT by changing level of a control current (direct current) flowing through a control winding NC according to variation in level of the secondary-side direct-current output voltage E01. This changes resonance conditions of a series resonant circuit including the inductance LB1 of the driving winding NB1 within a self-oscillation driving circuit for a main switching device Q1, whereby the switching frequency of the main switching device Q1 is changed.

In this case, as with the power supply circuit shown in FIG. 1, the power supply circuit according to the fifth embodiment has a secondary winding N3 wound on the secondary side of an isolation converter transformer PIT. The secondary winding N3 is provided with a center tap. Rectifier diodes D01 and D02 and a smoothing capacitor C02 are connected to the secondary winding N3 as shown in the figure, whereby a full-wave rectifier circuit of the [rectifier diodes D01 and D02 and smoothing capacitor C02] is formed to generate a direct-current output voltage E02.

FIGS. 15A, 15B, 15C, 15D, 15E, 15F, 15G, and 15H are waveform charts showing operation of main parts in the thus formed power supply circuit according to the fifth embodiment. As with the waveform charts of the foregoing embodiments, the waveforms shown in FIGS. 15A to 15H show experimental results at an alternating input voltage VAC=100 V and a load power Po=200 W.

Figure 16:
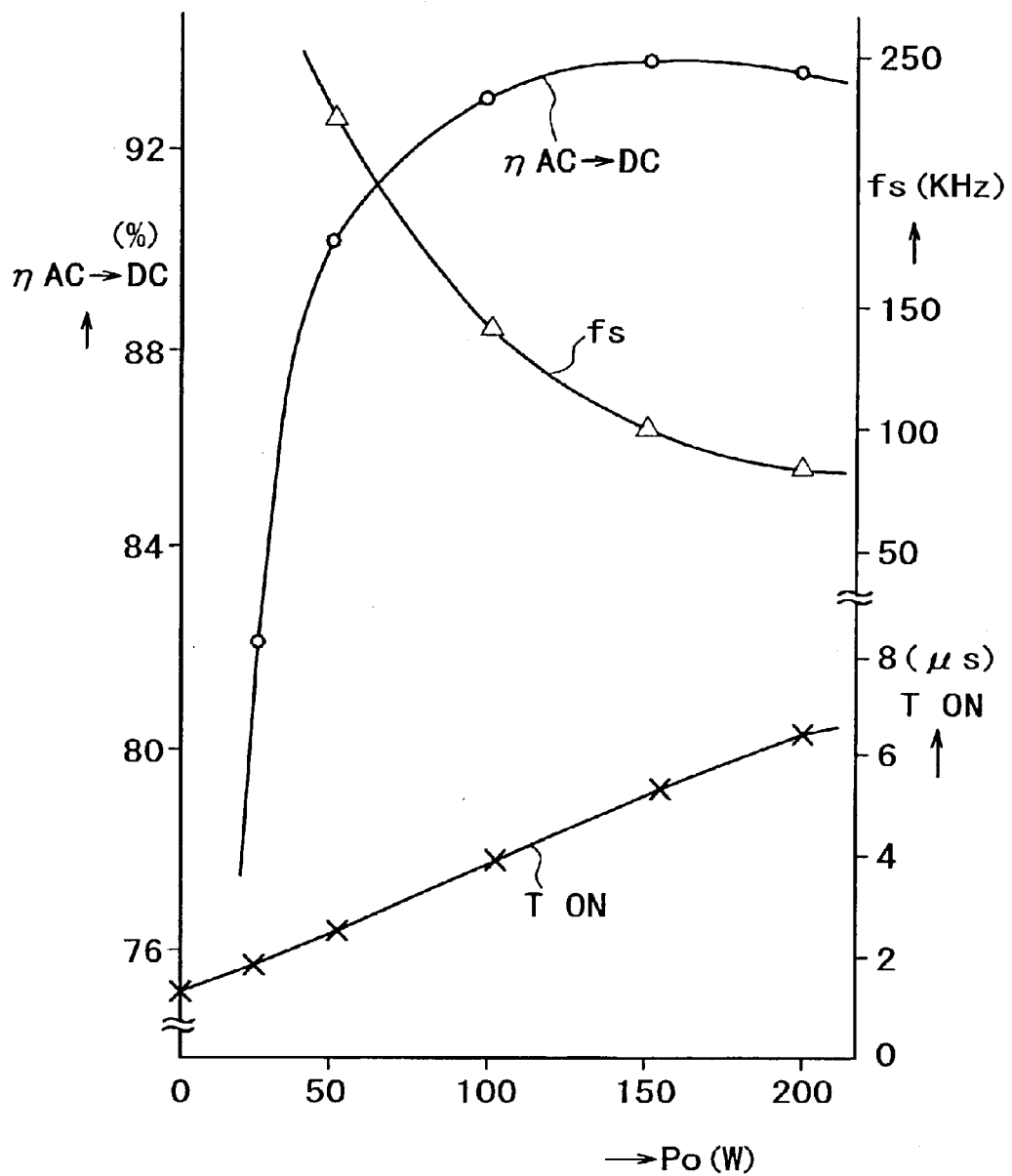
FIG. 16 is a characteristic diagram showing characteristics of power conversion efficiency, switching frequency, and period TON with respect to load power of the power supply circuit according to the fifth embodiment.

FIG. 16 shows characteristics of variations in AC-to-DC power conversion efficiency ($\eta$AC→DC), switching frequency fs, and the on period TON of a switching device Q2 (or Q1) when the load power Po in the power supply circuit according to the fifth embodiment is varied in a range of 0 W to 200 W.

In obtaining experimental results shown in FIGS. 15A to 15H and FIG. 16, components forming the power supply circuit are selected as follows, for example.

Primary winding N1=45 T
Secondary winding N2=50 T
Primary-side series resonant capacitor C1=0.033 $\mu$f
Partial resonance capacitor Cp=470 pF
Secondary-side parallel resonant capacitor C2=2200 pF
Capacitor C4=0.033 $\mu$F As shown in the waveform charts of FIGS. 15A to 15H, a collector current IQ2 of the switching device Q2 is 2.2 Ap-p, and thereby a primary winding current 11 flowing through the primary winding N1 is 4.4 Ap-p. On the other hand, the primary winding current 11 in the prior art power supply circuit of FIG. 18 is 6.0 Ap-p. Thus, the primary winding current 11 in the power supply circuit according to the fifth embodiment is also reduced as compared with the prior art power supply circuit of FIG. 18.

Also in FIGS. 15A to 15H, a resonance current IC3 flows through the secondary-side parallel resonant capacitor C2 of small capacitance in timing in which fast recovery type rectifier diodes on the secondary side are turned on and turned off. This indicates partial voltage resonance operation obtained on the secondary side. Corresponding to a period during which the resonance current IC3 flows, a gradient is provided to a waveform when a voltage (V2) applied to the fast recovery type diodes forming a bridge rectifier circuit DBR is inverted.

According to the characteristic diagram of FIG. 16, while the AC-to-DC power conversion efficiency ($\eta$AC→DC) of the prior art power supply circuit shown in FIG. 18 at the maximum load power Pomax=200 W, for example, is $\eta$AC→DC=91.8%, the AC-to-DC power conversion efficiency ($\eta$AC→DC) of the power supply circuit according to the fifth embodiment is improved to $\eta$AC→DC=93.6%. The experimental results obtained also show that alternating-current input power of the power supply circuit according to the fifth embodiment is reduced by 4.2 W as compared with the power supply circuit shown in FIG. 18.

As has been described in the foregoing embodiments, the power conversion efficiency in the fifth embodiment is thus improved because with no gap formed in the isolation converter transformer PIT, eddy current loss and the like in the isolation converter transformer PIT are eliminated and the primary winding current 11 is reduced, as shown in the waveform charts of FIGS. 15A to 15H. That is, the power conversion efficiency in the fifth embodiment is improved because power loss due to eddy current loss is eliminated and switching loss is reduced.

Further, in this case, the power conversion efficiency is improved because switching loss at the fast recovery type rectifier diodes when the full-wave rectifier circuit on the secondary side (DBR, C01) performs rectifying operation is reduced by a combination of the secondary-side parallel resonant capacitor C2 for partial voltage resonance connected in parallel with the secondary winding N2 and the bridge rectifier circuit DBR formed by the fast recovery type rectifier diodes.

The switching frequency fs is controlled to be decreased as the load becomes heavier. As the switching frequency is controlled to be decreased, the on period TON of the switching device Q2 is controlled to be lengthened.

As in the case of the fourth embodiment, the power supply circuit according to the fifth embodiment can employ the circuit configurations shown in FIGS. 13A and 13B as a secondary-side configuration thereof. When the configuration of the full-wave rectifier circuit shown in FIG. 13A is employed, a center tap is provided with the number of turns of the secondary winding N2 set to 50 T+50 T, and the secondary-side parallel resonant capacitor C2 is selected to be 470 pF.

When the configuration of the voltage doubler rectifier circuit shown in FIG. 13B is employed, selection is made such that the secondary winding N2=25 T and the secondary-side parallel resonant capacitor C2=8200 pF.

Figure 17:
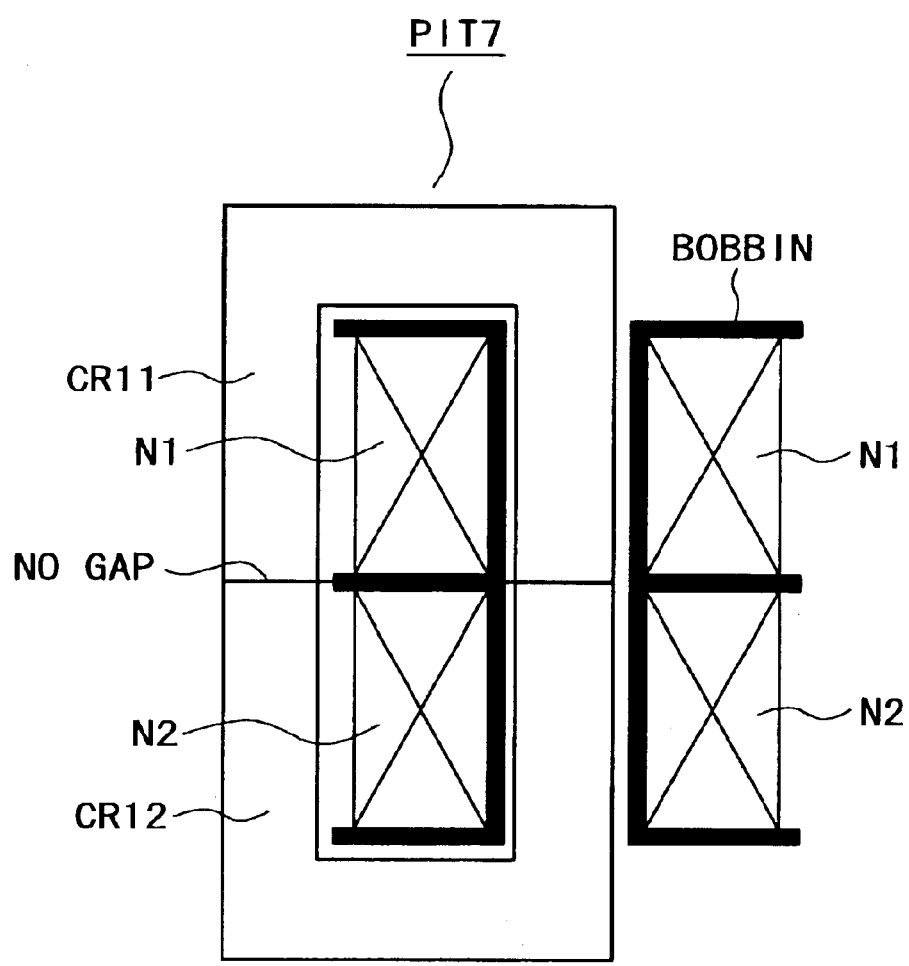
FIG. 17 is a sectional view of another example of structure of an isolation converter transformer applicable to the power supply circuits according to the first to fifth embodiments.

It is to be noted that while the embodiments have been described by taking as an example a case where an isolation converter transformer PIT is formed with an E-E-shaped core, it is of course a mere example. For example, it is of course possible to form the isolation converter transformer PIT using a U-U-shaped core CR with no gap G formed at portions where ends of magnetic legs of a U-shaped core CR1 are opposed to ends of magnetic legs of a U-shaped core CR2, as shown in FIG. 17. In this case, a dividing bobbin B is attached to one magnetic leg of the U-U-shaped core CR, and a primary winding N1 and a secondary winding N2 are wound around the dividing bobbin B in a state of being divided from each other.

Also, the present invention is not limited to configurations shown in figures as embodiments thereof. For example, the secondary-side configurations may be provided with a rectifier circuit having a circuit configuration other than shown in the figures.

What is claimed is:

1. A switching power supply circuit comprising:
   switching means formed by half-bridge coupling of two switching devices for performing a switching operation on a direct-current input voltage;
   a converter transformer having a primary winding and a secondary winding formed around a magnetic core and having no gap formed therein for transmitting an output of said switching means from the primary winding to the secondary winding;
   a primary-side series resonant circuit having a leakage inductance component including the primary winding of said converter transformer and a capacitance of a primary-side series resonant capacitor connected in series with said primary winding for converting the switching operation of said switching devices into a current resonance type operation;
   a primary-side partial resonance capacitor connected in parallel with one of said two switching devices for effecting partial resonance with a timing corresponding to a turn-off time of said one of said two switching devices;
   switching driving means for applying a switching driving signal to said two switching devices for causing the switching operation thereof;
   a series circuit connected in parallel with said primary-side series resonant capacitor and formed at least by a series connection of an auxiliary switching device for performing a switching operation so as to have an on period in correspondence with a timing of turning off the switching device with which said primary-side partial resonance capacitor is connected and a capacitor having a capacitance value greater than a predetermined capacitance value; and
   direct-current output voltage generating means for receiving an alternating voltage obtained at the secondary winding of said isolation converter transformer as an input and generating a predetermined secondary-side direct-current output voltage.

2. The switching power supply circuit as claimed in claim 1, further comprising constant-voltage control means for effecting constant-voltage control on said secondary-side direct-current output voltage.

3. The switching power supply circuit as claimed in claim 2,
   wherein said constant-voltage control means effects constant-voltage control on said secondary-side direct-current output voltage by variably controlling a switching frequency of said switching driving means according to a level of said secondary-side direct-current output voltage.

4. The switching power supply circuit as claimed in claim 2,
   wherein said constant-voltage control means effects constant-voltage control on said secondary-side direct-current output voltage by varying a conduction angle of said auxiliary switching device and by variably controlling a switching frequency of said switching driving means according to a level of said secondary-side direct-current output voltage.

5. The switching power supply circuit as claimed in claim 1, further comprising a secondary-side partial resonance circuit formed by the secondary winding of said isolation converter transformer and a secondary-side partial resonance capacitor connected in parallel with the secondary winding for effecting a partial resonance in correspondence with a timing of turning off a rectifier diode device forming said direct-current output voltage generating means,
   wherein the capacitance value of said secondary-side partial resonance capacitor and said primary-side series resonant capacitor is selected such that a primary-side resonance frequency is lower than a predetermined frequency in relation to a switching frequency of said switching means.

6. The switching power supply circuit as claimed in claim 1,
   wherein said switching driving means comprises a self-oscillation driving circuit for self-excited switching driving of said two switching devices.

7. The switching power supply circuit as claimed in claim 1,
   wherein said switching driving means comprises an external oscillation driving circuit for externally excited switching driving of said two switching devices.

8. The switching power supply circuit as claimed in claim 1,
   wherein said converter transformer is formed by winding said primary winding and said secondary winding around a central magnetic leg of an E-E-shaped core formed by combining a pair of E-shaped cores with each other.

9. The switching power supply circuit as claimed in claim 1,
wherein said converter transformer is formed by winding said primary winding and said secondary winding around one magnetic leg of a U-U-shaped core formed by combining a pair of U-shaped cores with each other.

* * * * *